United States Patent
Cheng et al.

(10) Patent No.: US 8,235,157 B2
(45) Date of Patent: Aug. 7, 2012

(54) STEP HOLDER ATTACHMENT STRUCTURE FOR A SADDLE-TYPE VEHICLE, AND VEHICLE INCORPORATING SAME

(75) Inventors: Yuliang Cheng, Saitama (JP); Satoru Nojima, Saitama (JP); Kenji Morita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 12/717,490

(22) Filed: Mar. 4, 2010

(65) Prior Publication Data
US 2010/0243359 A1      Sep. 30, 2010

(30) Foreign Application Priority Data
Mar. 31, 2009   (JP) .................................. 2009-087774

(51) Int. Cl.
    *B62D 61/02*   (2006.01)
(52) U.S. Cl. ..................................... 180/219; 280/288.4
(58) Field of Classification Search .................. 180/219, 180/227, 288.4, 291, 294, 281.1, 163, 164.1; 74/564
    See application file for complete search history.

(56) References Cited

U.S. PATENT DOCUMENTS

| | | | |
|---|---|---|---|
| 4,041,798 A * | 8/1977 | Shinozaki et al. | 74/512 |
| 5,354,086 A * | 10/1994 | Mueller | 280/291 |
| 6,688,628 B2 * | 2/2004 | Burkett | 280/291 |
| 7,097,259 B2 * | 8/2006 | Toyoda | 301/110.5 |
| 2003/0151227 A1 * | 8/2003 | Tokumura et al. | 280/291 |
| 2009/0058030 A1 | 3/2009 | Fujita et al. | |
| 2011/0020060 A1 * | 1/2011 | Owyang | 403/408.1 |

FOREIGN PATENT DOCUMENTS

| | | |
|---|---|---|
| EP | 1 908 678 A2 | 4/2008 |
| JP | S55-009749 U | 1/1980 |
| JP | 2004-268774 | 9/2004 |

\* cited by examiner

*Primary Examiner* — Tashiana Adams
(74) *Attorney, Agent, or Firm* — Carrier Blackman & Associates, P.C.; William D. Blackman; Joseph P. Carrier

(57) ABSTRACT

A saddle-type vehicle includes a passenger step member, a brake pedal, a step holder having the passenger step member and the brake pedal mounted thereon, and a master cylinder adapted to convert a tread force from the brake pedal into brake pressure. The master cylinder is mounted on a support bracket, which is separate from the step holder. The support bracket and the step holder are temporarily assembled with each other, and are co-fastened to a vehicle body frame of the vehicle such that a gap is formed between the support bracket and the step holder. During operation of the vehicle, such configuration of the support bracket and the step holder having the gap formed therebetween minimizes transmission of vibration from the support bracket to the step holder.

18 Claims, 21 Drawing Sheets

STEP HOLDER ATTACHMENT STRUCTURE FOR A SADDLE-TYPE VEHICLE, AND VEHICLE INCORPORATING SAME

CROSS-REFERENCE TO RELATED APPLICATIONS

The present invention claims priority under 35 USC 119 based on Japanese patent application No. 2009-087774, filed on Mar. 31, 2009. The entire subject matter of this priority document, including specification claims and drawings thereof, is incorporated by reference herein.

BACKGROUND OF THE INVENTION

1. Field of the Invention

The present invention relates to a step holder attachment structure for a saddle-type vehicle, and to a vehicle incorporating the same. More particularly, the present invention relates to a step holder attachment structure including a step holder and a support bracket for securing a master cylinder thereon, the support bracket being formed separately from the step holder, and to a vehicle incorporating the novel step holder attachment structure.

2. Description of the Background Art

There is a known motorcycle, e.g., a saddle-type vehicle, having a step holder attachment structure including a step holder, in which a rear master cylinder is attached to the step holder. If the master cylinder is initially attached to the step holder, it is possible to temporarily attach a step member and a rear brake application system to the step holder, which facilitates assembly work.

An example of such saddle-type vehicle is disclosed in Japanese Patent Laid-Open No. 2004-268774.

However, the motorcycle described in Japanese Patent Laid-Open No. 2004-268774 includes a heavy master cylinder fastened to a plate-like step holder. Such configuration of the step holder attachment structure, during operation of the motorcycle, leads to vibration of the step holder. The step holder may also sometimes resonate depending on engine speed.

The present invention has been made to overcome such drawbacks of the existing step holder attachment structure. Accordingly, it is one of the objects of the present invention to provide a saddle-type vehicle that prevents or at least minimizes the resonance of a step holder for suppressing the vibration of a step member as much as possible while allowing for temporary assembling of a rear brake application system on a step holder.

SUMMARY OF THE INVENTION

In order to achieve the above objects, a first aspect of the present invention provides a saddle-type vehicle including: a vehicle body frame, a passenger step member, a brake pedal, a step holder having the passenger step member and the brake pedal are mounted thereon; and a master cylinder adapted to convert a tread force received from the brake pedal into brake pressure. The master cylinder is mounted on a support bracket separate from the step holder. The support bracket and the step holder are temporarily assembled to each other, and the step holder and the support bracket are co-fastened to a body frame.

In the saddle-type vehicle according to the first aspect, the master cylinder is co-fastened to the step holder via the support bracket for enhancing assembly performance. In addition, even if the support bracket, which is formed separately from the step holder, vibrates due to the composite configuration in which the separate members are integrally co-fastened to each other, the vibration of the step holder can be suppressed, that is, a vibration suppression effect can be provided.

The present invention according to a second aspect thereof, in addition to the first aspect, further comprises a stop switch attached to the support bracket, a brake pedal shaft provided inwardly of the step holder in a vehicle-width direction, a bearing portion adapted to receive the brake pedal shaft insertably passed therethrough provided at a rear portion of the brake pedal, and a washer member provided inwardly of the bearing portion of the brake pedal in the vehicle-width direction. The washer member includes an annular portion inserted into the brake pedal shaft, and an arm portion extending radially outwardly from the annular portion. One end of a stop switch spring connected to the stop switch is connected to the arm portion of the washer member, and during operation, the washer member is turned together with the pedal through a retaining ring or nut-fastening member.

In the saddle-type vehicle according to the second aspect, the washer member is integrally secured to the bearing portion of the brake pedal externally inserted into the brake pedal shaft. Therefore, the turning of the brake pedal can operate the stop switch with a simple structure in which the arm portion of the washer member is mediated.

The present invention according to a third aspect thereof, in addition to the second aspect, is characterized in that the brake pedal shaft is provided with a circumferential groove at an end portion, a recessed portion is provided on inner lateral surface of the brake pedal bearing portion in the vehicle-width direction, the washer member further includes a tongue portion extending radially outwardly from the annular portion and bending outwardly in a vehicle-width direction, the retaining ring is provided inwardly of the washer member in a vehicle-width direction so as to be engaged with the circumferential groove of the brake pedal shaft, and the tongue portion of the washer member is engaged with the recessed portion of the bearing portion of the brake pedal.

In the saddle-type vehicle according to the third aspect, the washer member is engaged with the recessed portion of the brake pedal bearing portion through the tongue portion become impossible to rotate with respect to each other. Thus, a securing structure for integral rotation is configured in a compact manner.

The present invention according to a fourth aspect thereof, in addition to one of the second and third aspects, is characterized in that the master cylinder is mounted on an upper rear portion of the support bracket, and a C-shaped stop switch stay is provided at the upper portion of the support bracket forward of the master cylinder so as to be engaged with a groove in a lateral surface of the stop switch.

In the saddle-type vehicle according to the fourth aspect, the stop switch and the master cylinder are arranged forward and rearward, respectively, such that the brake pedal shaft is disposed therebetween. Therefore, the stop switch is disposed at a position suited to obtain a pulling force from a pedal operating force. Thus, no space is wasted among the various components, thereby allowing for space-saving arrangement.

The present invention according to a fifth aspect thereof, in addition to the fourth aspect, is characterized in that the stop switch stay is partially formed with an extending portion extending radially outwardly of the C-shaped ring, and a stop switch cover engaged with the extending portion and fastened to the support bracket is provided inwardly of the stop switch in the vehicle-width direction.

In the saddle-type vehicle according to the fifth aspect, since the stop switch cover fastened to the support bracket is further engaged with the extending portion, the heat shield and protection of the stop switch can be ensured.

The present invention according to a sixth aspect thereof, in addition to the first aspect, is characterized in that a stop switch is mounted to the step holder, a link member having a stop switch connecting portion and a link connecting portion is provided, the link member is pivotally supported by the support bracket, the brake pedal is provided with a link connecting arm, and a connecting member connected to a link connecting portion of the link member and to the link connecting arm of the brake pedal is provided.

In the saddle-type vehicle according to the sixth aspect, when the brake pedal is depressed, the connecting member pulls the link connecting portion of the link member to turn the link member, which pulls the stop switch for operation. Thus, the flexibility of arrangement of the master cylinder and the stop switch can be enhanced.

EFFECTS OF THE INVENTION

According to the first aspect hereof, the rear master cylinder can be temporarily assembled with the support bracket, which is separate from the step holder. The step holder and the support bracket are co-fastened to the body frame. Therefore, assembly performance is satisfactory. In addition, even if the support bracket resonates, the step holder will not resonate, thereby preventing the vibration of the step.

According to the saddle-type vehicle recited in the second aspect hereof, the pulling mechanism of the stop switch can be provided in a compact manner.

According to the saddle-type vehicle recited in the third aspect hereof, the washer can be turned integrally with the bearing of the pedal. Therefore, the pulling mechanism of the stop switch can be provided in a compact manner. The length of the pedal shaft can be reduced according to the shaft length of the nut compared with the structure in which the washer is secured by nut-fastening. In addition, it is not necessary to provide a large seat surface for the nut on the bearing portion of the pedal; therefore, the rear bake application system can be made more compact.

According to the saddle-type vehicle recited in the fourth aspect hereof, the stop switch and the master cylinder are arranged forward and rearward, respectively, of the brake pedal shaft put therebetween. Therefore, the brake application system can be made compact. Also, the support bracket can be attached in the state where the stop switch, the washer and the stop switch spring are temporarily assembled.

According to the saddle-type vehicle recited in the fifth aspect hereof, the stop switch can be shielded from heat and protected with a small number of components.

According to the saddle-type vehicle recited in the sixth aspect hereof, since the link member is provided, in addition to the effect of the first aspect, the flexibility of the arrangement of the master cylinder and the stop switch can be increased.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
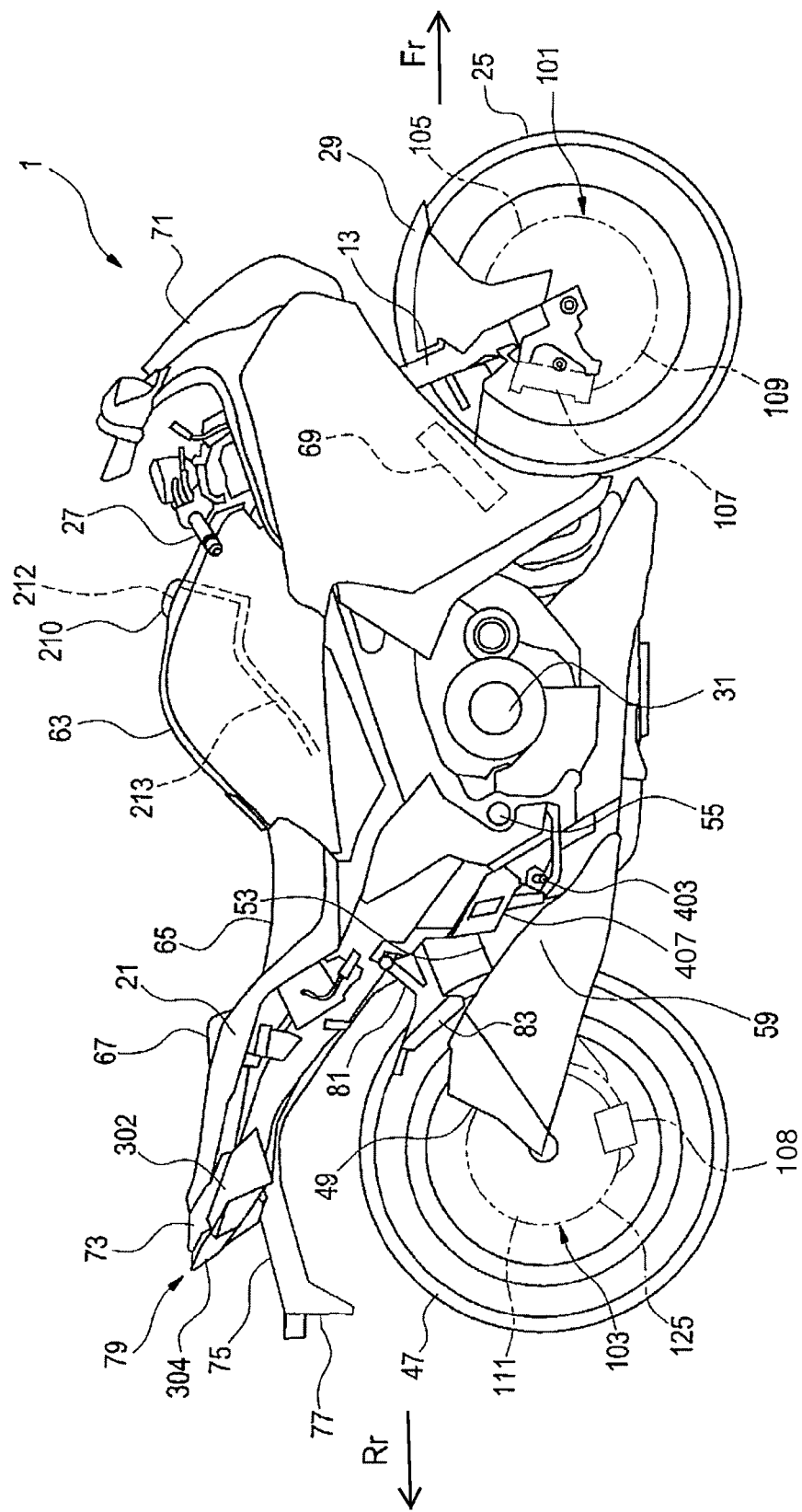
FIG. 1 is a side view illustrating a basic configuration of a motorcycle according to an illustrative embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative embodiment of a saddle-type vehicle according to the present invention is described hereinafter in detail with reference to the drawings. It may be noted that the drawings shall be viewed based on the direction of reference numerals.

In the following description, the front and rear, left and right, and up and down are based on the direction of a rider while normally operating the vehicle, in which the front, rear, left, right, upside and downside of the vehicle are denoted with symbols "Fr," "Rr," "L," "R," "U" and "D," respectively.

The present invention may preferably be applied to saddle-type vehicles such as, e.g., motorcycles.

Figure 2:
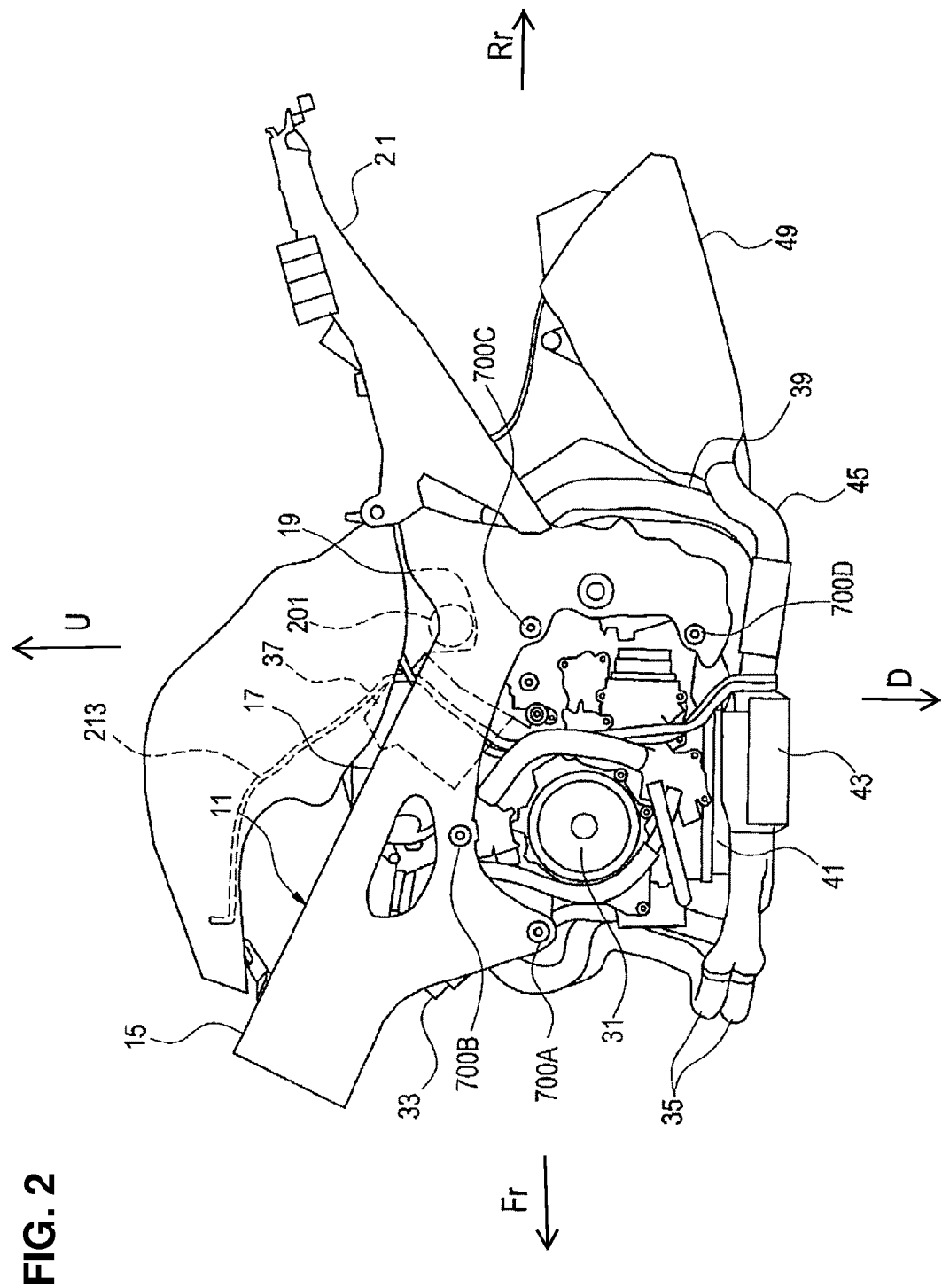
FIG. 2 is a left side view of an essential portion of a vehicle body.

FIG. 1 is a side plan view illustrating a motorcycle 1 according to an illustrative embodiment of the present invention. FIG. 2 is a left side detail plan view of an essential portion of a vehicle body.

The motorcycle 1 includes a vehicle body frame 11. The vehicle body frame 11 includes a head pipe 15, a pair of left and right main frames 17, a pair of left and right intermediate frames 19 and a pair of left and right seat rails 21. The head pipe 15 steerably supports a front fork 13. The main frames 17 extend rearward downward from the head pipe 15. The intermediate frames 19 are provided continuously with the corresponding rear ends of both the main frames 17 so as to extend substantially vertically. The seat rails 21 extend rearward upwardly from the corresponding upper portions of the intermediate frames 19.

A front wheel 25 is rotatably supported by the lower end of the front fork 13. A handlebar 27 is connected to an upper end of the front fork 13. A front fender 29 is supported by the front fork 13 for covering the front wheel 25 from above.

As shown in FIG. 1, disk brakes 101 and 103 are mounted to the front wheel 25 and the rear wheel 47, respectively. For example, the disk brake 101 for the front wheel 25 includes a brake disk 105 secured to and rotated integrally with the front wheel 25 and a caliper 107 mounted to the front fork 13. The disc brake 103 for the rear wheel 47, for example, includes a brake disc 111 and a caliper 108. The caliper 107 incorporates a pair of left and right friction pads. The friction pads are moved toward and away from each other via a piston (not shown) by hydraulic pressure generated by a master cylinder (not shown).

The friction pads clampingly press braking surfaces 109 on both sides of the brake disk 105 for applying a braking force to the front wheel 25. Similarly, the friction pads hold clampingly press braking surfaces 125 on both lateral surfaces of the brake disk 111 to apply a braking force to the rear wheel 47.

A V-type water-cooled four-cylinder engine 31 is suspended from the main frames 17 and the intermediate frames 19 so as to be supported by a first support portion 700A, a second support portion 700B, a third support portion 700C and a fourth support portion 700D. Front cylinder exhaust pipes 35 extend forward from front cylinders 33 of the engine 31.

Rear cylinder exhaust pipes 39 extend rearwardly from a rear cylinder 37 of the engine 31, and then extend forwardly and again rearwardly. The front cylinder exhaust pipes 35 and the rear cylinder exhaust pipes 39 extend downward along the front surface of a crankcase 41 of the engine 31, passing through a catalyst chamber (the CAT chamber) 43, and, are arranged below the crankcase 41.

The catalyst chamber 43 is connected, via a collecting pipe (described later), to a rear collecting pipe 45. The rear collecting pipe 45 is disposed in a space defined between the lower portion of the crankcase 41 and the rear wheel 47, and is connected to a muffler 49 extending on the vehicle body right side of the rear wheel 47. The rear collecting pipe 45 is supported at a position below the crankcase 41.

The muffler 49 is arranged to intersect the swing arm 53, as viewed from the side. The swing arm 53 supports the rear wheel 47 at a rear end portion thereof. The swing arm 53 is vertically swingably supported at a front end portion thereof by a pivot shaft 55, and is located below the muffler 49 and suspended by a rear shock absorber 57 provided between an upper end portion of a pivot plate 51 and the swing arm 53.

A step holder 407 is arranged between the front wheel 25 and the rear wheel 47. The step holder 407 is equipped with a passenger step member 403.

The output power of the engine 31 is transmitted, via a drive shaft 59, to the rear wheel 47. The drive shaft 59 is incorporated in the swing arm 53 disposed on the left side of the engine 31 in the state of facing the front Fr in the traveling direction of the motorcycle.

A fuel tank 63 supported by the main frames 17 is disposed above the engine 31. A passenger seat (main seat) 65 used to sit a rider thereon is disposed behind the fuel tank 63, and is supported by the seat rails 21. A pillion seat 67 for a pillion passenger is disposed behind the main seat 65.

A canister 201 is provided below the rear portion of the fuel tank 63 for capturing fuel vapor from the fuel tank 63. In FIG. 1, the fuel tank 63 includes a lid 210, a fill opening 212 and a purge pipe 213.

A radiator 69 is disposed in front of the engine 31. The head pipe 15 of the vehicle body frame 11 is covered from the front by a front cowl 71. The front cowl is made of synthetic resin. The front portion of the main frames 17, the radiator 69, and the front portion and lower portion of the engine 31 are covered from both sides by synthetic resin-made lower side cowls (not illustrated) continuous with the front cowl 71.

A rear cowl 73 and a rear fender 75 are attached to the rear portion of the body frame 11. The rear cowl 73 covers the rear portion of the body frame 11. The rear fender 75 is disposed below the rear cowl 73 for covering the rear wheel 47 from above. A pair of left and right plate attachment portions 77 for attaching a license plate (not shown) thereto are provided on the rear fender 75.

A rear combination lamp 79 is disposed in the rear cowl 73 such that a rear portion of the rear combination lamp 79 is faced to the rearward from the rear end of the rear cowl 73. The rear combination lamp 79 is an integral combination of a pair of left and right turn signal lamps 302 and a tail and stop lamp 304 located between the left and right turn signal lamps 302. As shown in FIG. 1, the motorcycle 1 includes pillion step holders 81 provided on the left and right of the vehicle body and a pillion step 83.

Figure 3:
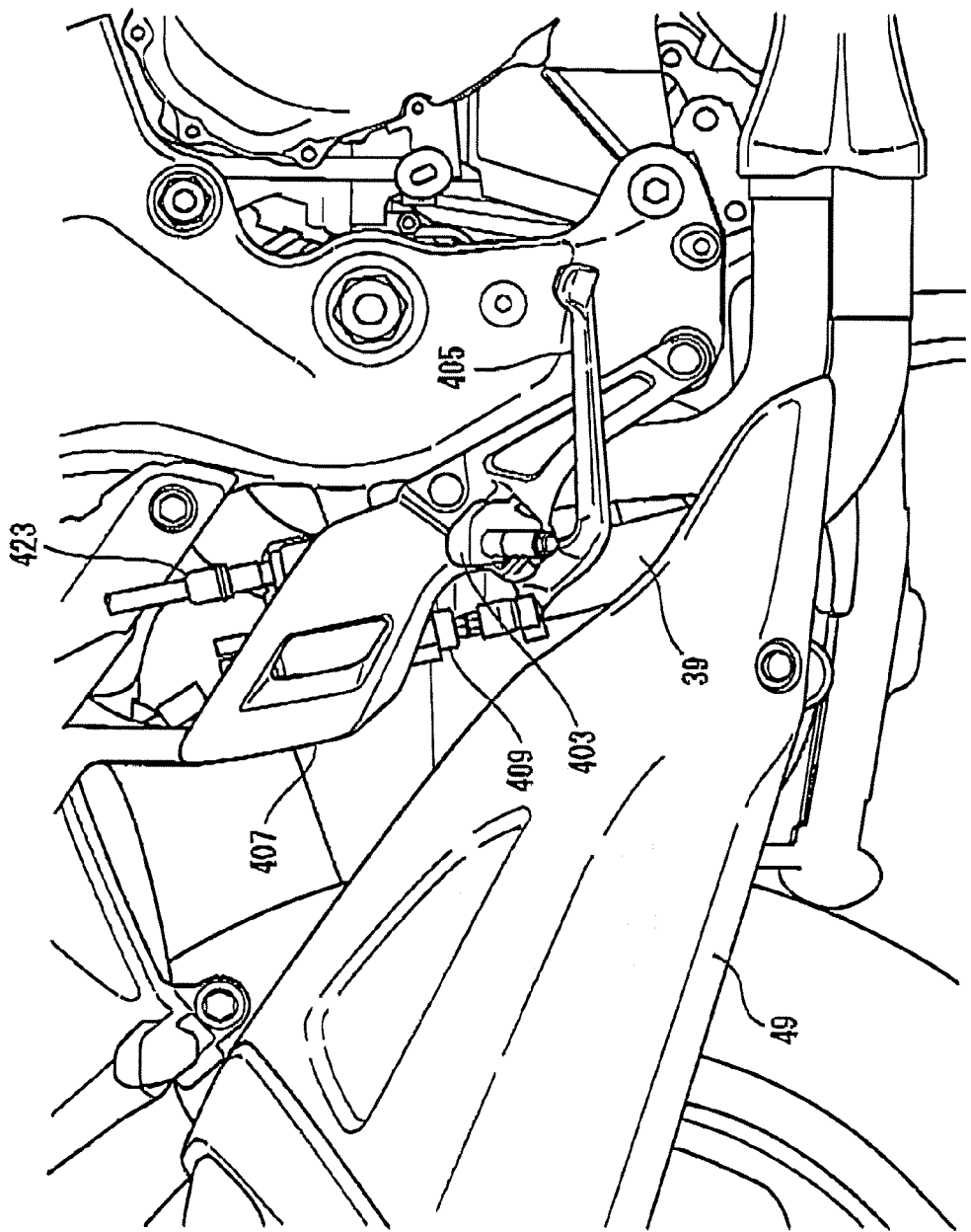
FIG. 3 is a right side view of the vehicle in the vicinity of a step holder attachment portion.
Figure 4:
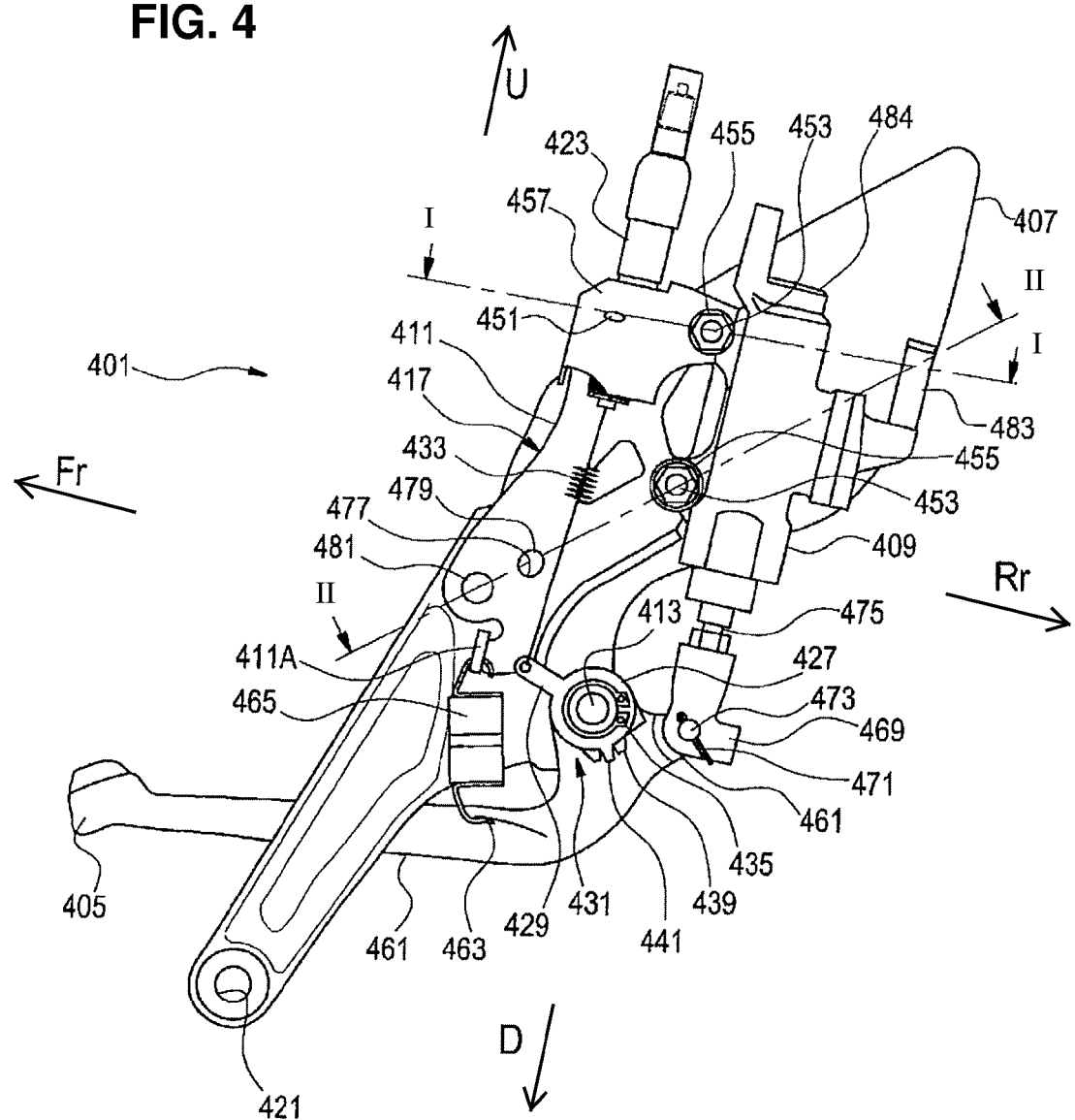
FIG. 4 is a lateral view of a step holder assembly as viewed from the inside of the vehicle.
Figure 5:
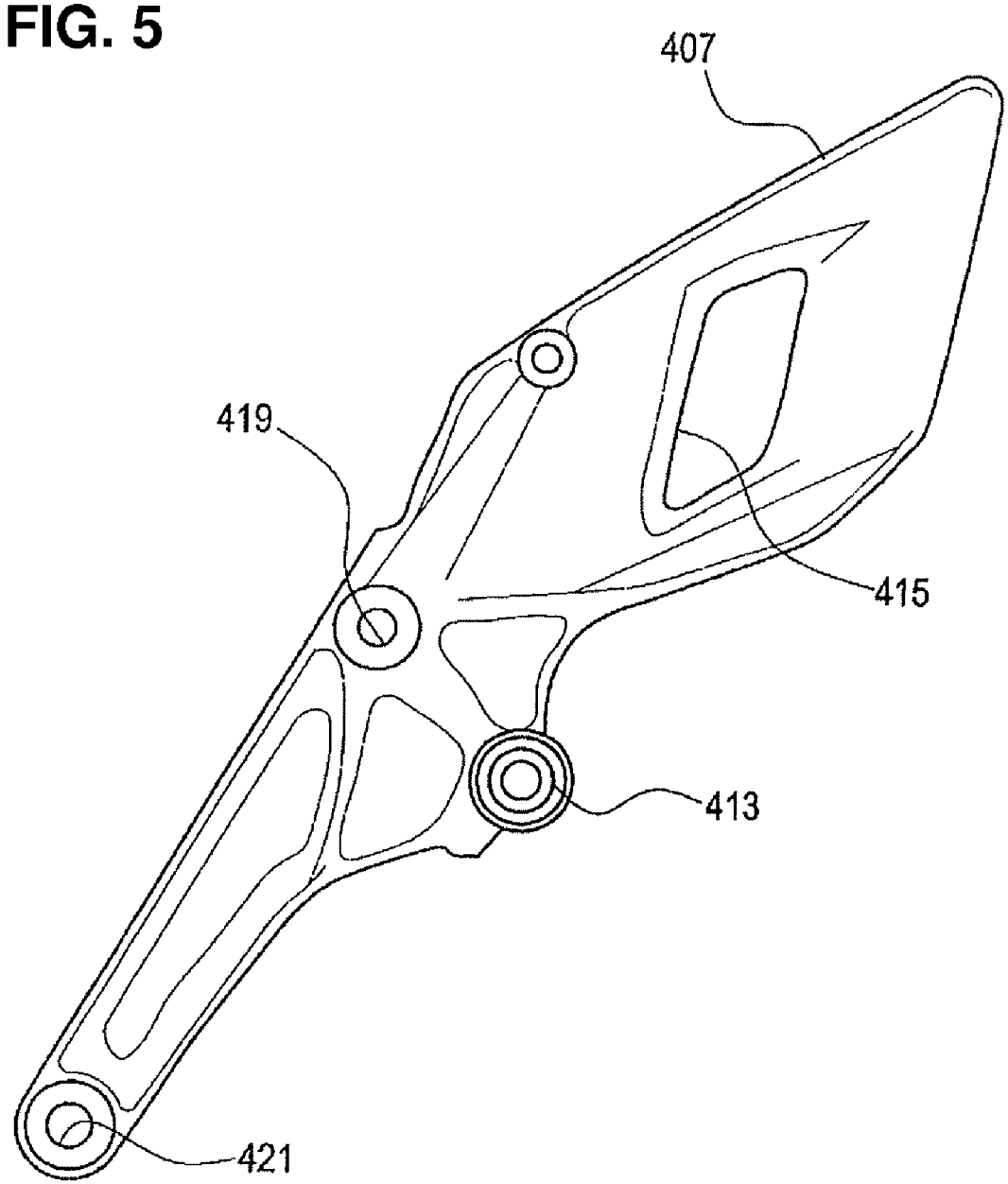
FIG. 5 is a lateral view of a step holder as viewed from the inside of the vehicle.
Figure 6:
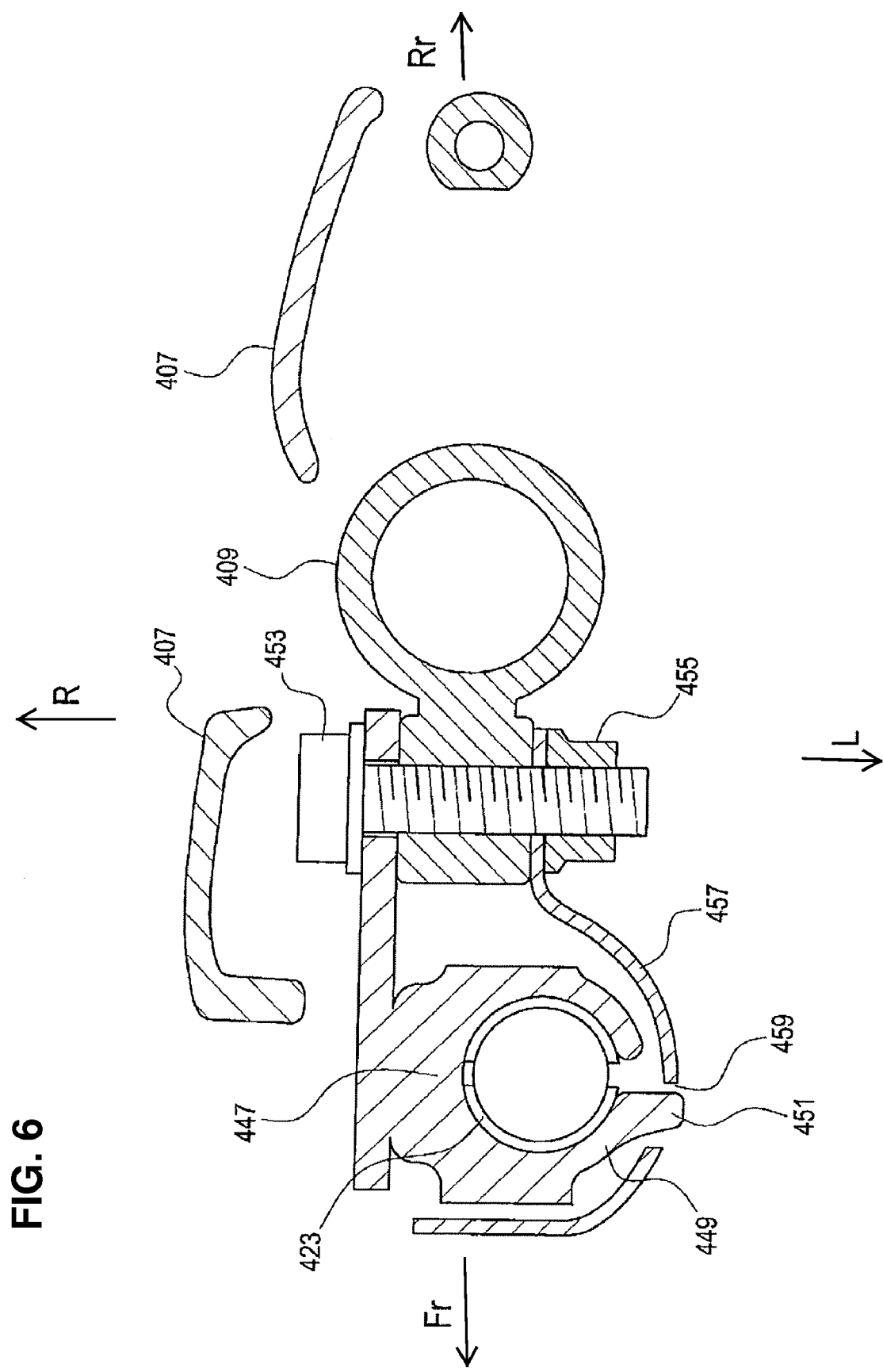
FIG. 6 is a cross-sectional view taken along line I-I of FIG. 4.
Figure 7:
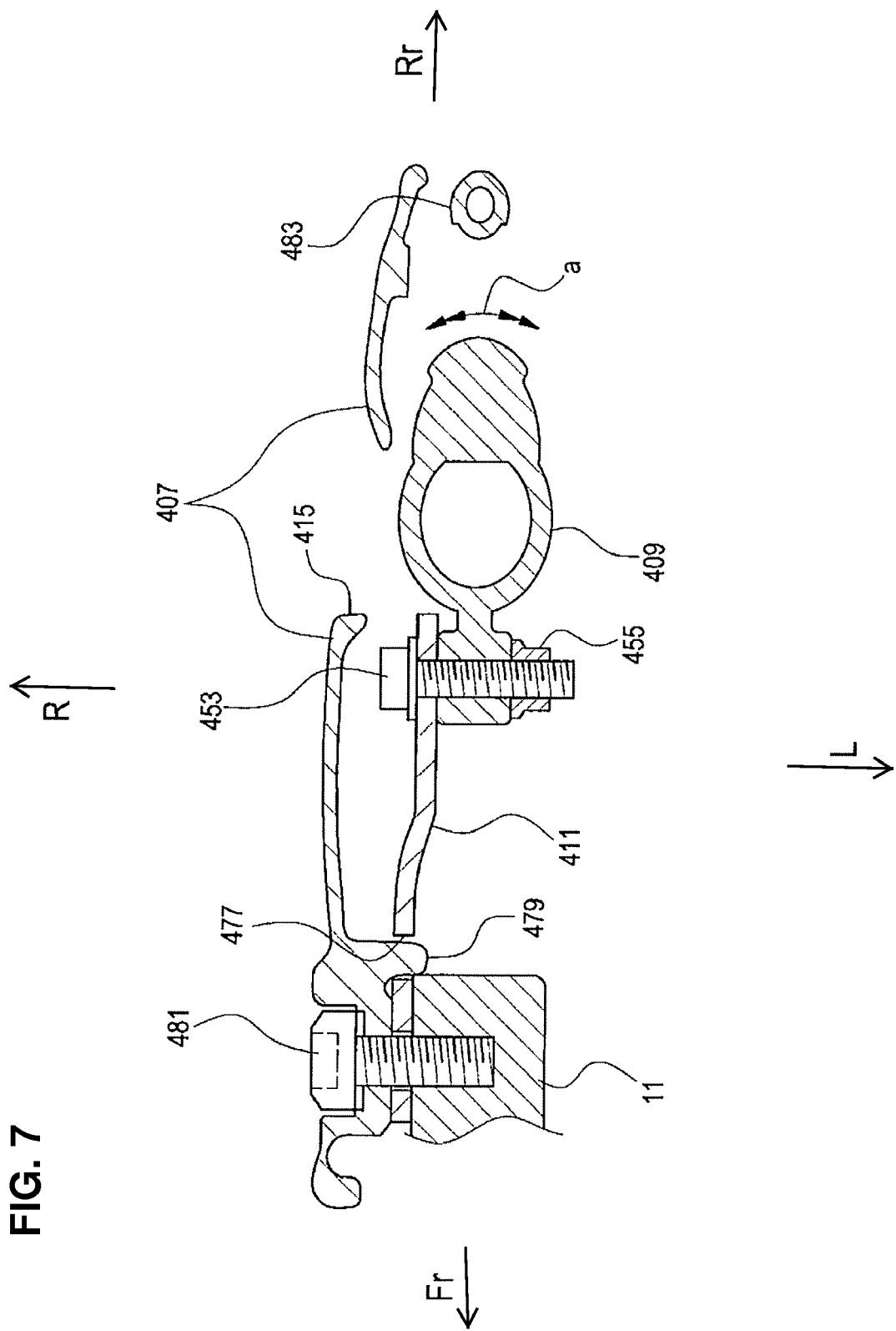
FIG. 7 is a cross-sectional view taken along line II-II of FIG. 4.
Figure 8:
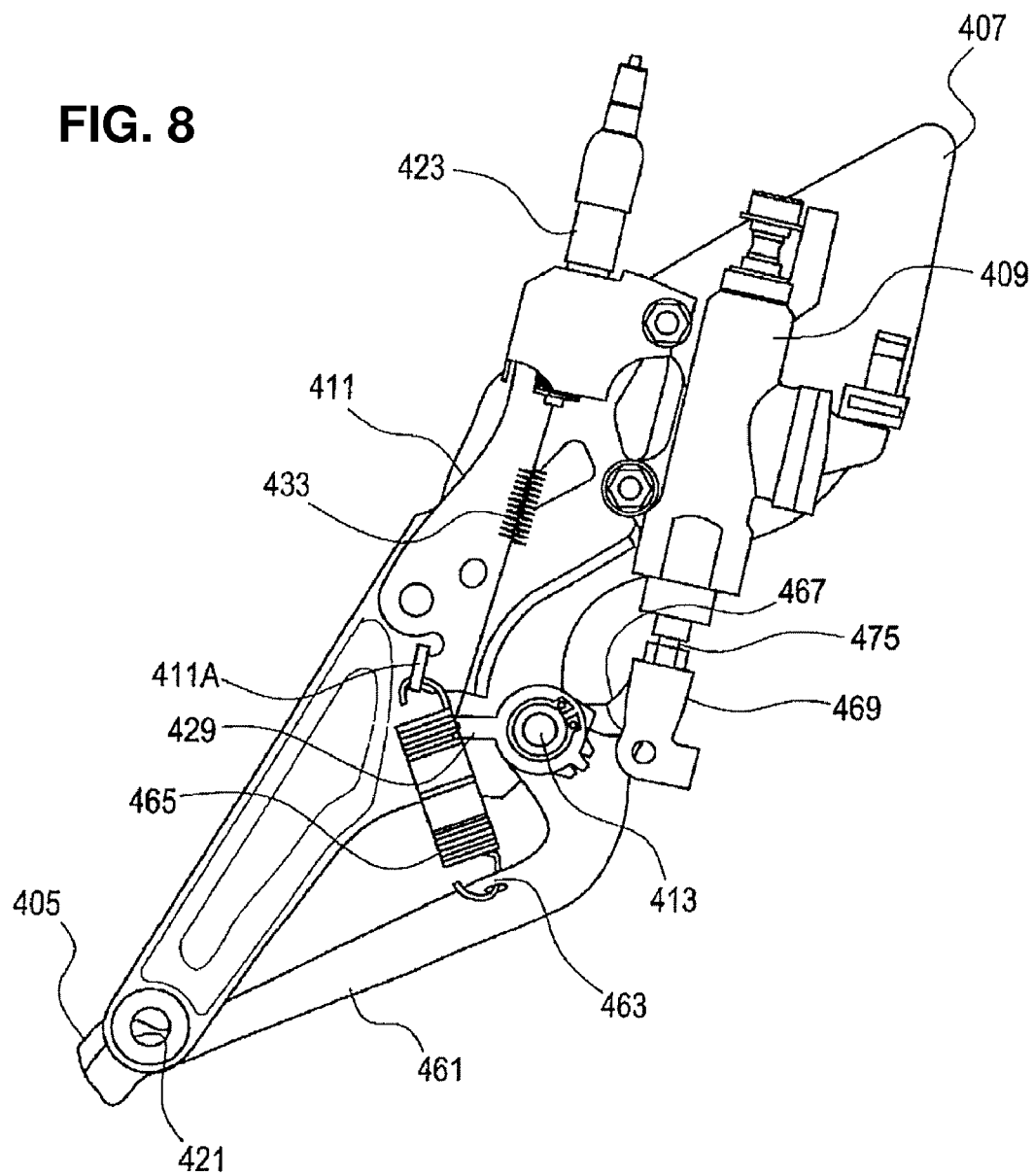
FIG. 8 is a view for explaining operation encountered when a brake pedal is depressed.

FIG. 3 is a right side view of the vehicle in the vicinity of a step holder attachment portion. FIG. 4 is a side view of a step holder assembly as viewed from the inside of the vehicle. FIG. 5 is a side view of a step holder as viewed from the inside of the vehicle. FIG. 6 is a cross-sectional view taken along line I-I of FIG. 4. FIG. 7 is a cross-sectional view taken along line II-II of FIG. 4. FIG. 8 is a view for explaining operation encountered when a brake pedal is depressed.

A step holder assembly 401 is provided between the front wheel 25 and rear wheel 47 of the motorcycle 1. The step holder assembly 401 is directly or indirectly attached to a vehicle body frame 11. The step holder assembly 401 includes a step holder 407. The passenger step member 403 (see FIG. 14) and a rear brake pedal 405 are attached to the step holder 407. A rear master cylinder 409 is adapted to convert a tread force from the brake pedal 405 into brake pressure.

The rear master cylinder 409 is attached to the step holder 407 via another stay (a master cylinder stay) which is a support bracket 411. The master cylinder support bracket 411 and the step holder 407 can be assembled temporarily, and are co-fastened to the body frame 11.

Referring to FIG. 5, the step holder 407 is made by casting using a light alloy material or the like. The step holder 407 is a general F-shaped plate having a narrow lower portion and a wide upper portion. A brake pedal shaft 413 is provided by casting at a vertically, generally central portion of the step holder 407 so as to project toward the inside of the vehicle. The upper portion of the step holder 407 is formed with a master cylinder-exposed window 415. The central portion and lower portion of the step holder 407 are bored with co-fastening holes 419 and 421, respectively, and are used for co-fastening the step holder 407, the brake pedal-temporal assembly 417 and the like (see FIG. 9).

A stop switch 423 is attached to the master cylinder support bracket 411. A brake pedal 405 is disposed inwardly of the step holder 407 in a vehicle-width direction. A bearing portion 425 is provided at a rear portion of the brake pedal 405, and is configured to receive a brake pedal shaft 413 inserted through. A washer member 431 is arranged inwardly of the bearing portion 425 (see FIG. 11) of the brake pedal shaft 413 in a vehicle-width direction. The washer member 431 includes an annular portion 427 adapted to receive the brake pedal shaft 413 therethrough, and an arm portion 429 extending radially outwardly from the annular portion 427.

One end of a stop switch spring 433 connected to the stop switch 423 is connected to the arm portion 429 of the washer member 431. The washer member 431 is integrally rotated with the brake pedal 405 either with a retaining ring 435, or through being fastened thereto, such as with a nut and bolt.

The master cylinder support bracket 411 is made of a material having a higher strength than strength of the material of the brake pedal 405. For example, in the present embodiment, the brake pedal 405 is made of a light alloy and the master cylinder support bracket 411 is made of high-tensile steel.

In the step holder assembly 401, the washer member 431 is integrally rotatably secured to the bearing portion 425 of the brake pedal 405 externally fitted to the brake pedal shaft 413. Thus, the rotation of the brake pedal 405 makes it possible to operate the stop switch 423 via the arm portion 429 of the washer member 431.

Figure 14:
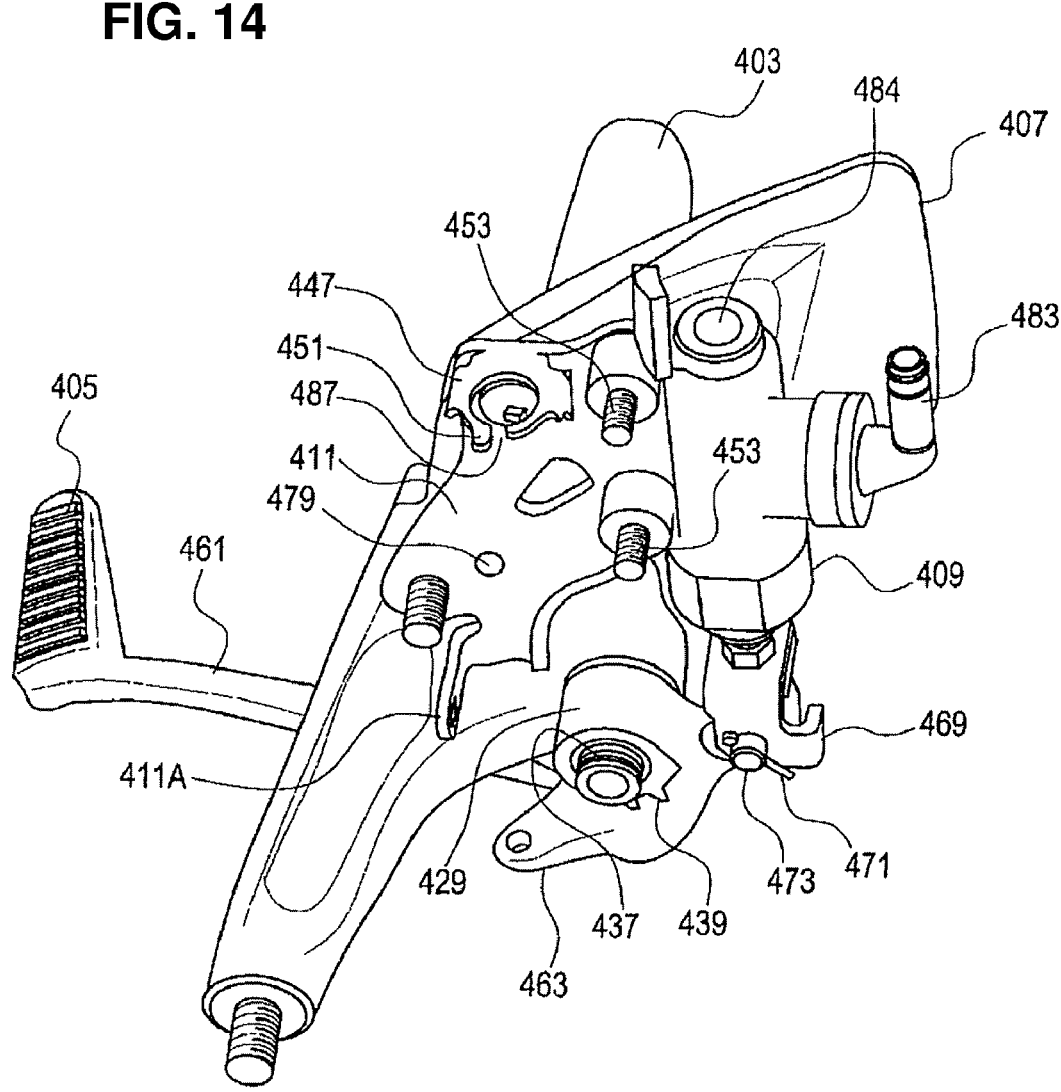
FIG. 14 is a perspective view of FIG. 12 as viewed obliquely from above.

The brake pedal shaft 413 is provided at an end with a circumferential groove 437 (see FIG. 14). A recessed portion 439 recessed radially inwardly is provided in a vehicle-width internal lateral surface of the bearing portion 425 of the brake pedal 405. The washer member 431 further has a tongue portion 441 extending radially outwardly from the annular portion 427, bending vehicle-width outwardly and engages the recessed portion 439. The retaining ring 435 is provided on the vehicle-width inside of the washer member 431 so as to be engaged with the circumferential groove 437 of the brake pedal shaft 413.

In the step holder assembly 401, the tongue portion 441 of the washer member 431 is engaged with the recessed portion 439 of the bearing portion 425 of the brake pedal 405 and becomes impossible to rotate relatively to each other. That is, the step holder assembly 401 is configured to have a simple securing structure for integral rotation.

The master cylinder 409 is attached to a rear upper portion of the master cylinder support bracket 411. A C-shaped stop switch stay 447 (see FIG. 6) is provided by welding at a portion, of the master cylinder support bracket 411, forward of the master cylinder 409 so as to engage the circumferential groove 445 (see FIG. 16) in the lateral surface of the stop switch 423.

In the step holder assembly 401, the stop switch 423 and the master cylinder 409 are arranged forward and rearward, respectively, such that the brake pedal shaft 413 is arranged therebetween. Therefore, the stop switch 423 is disposed at a position suited to obtain a pulling force from a pedal operating force. Thus, no waste spaces occur among the members, allowing for space-saving arrangement.

As illustrated in FIG. 6, the stop switch stay 447 has a C-shaped engagement ring portion 449 engaged with the circumferential groove 437 of the stop switch 423. The C-shaped engagement ring portion 449 has an extending portion 451 extending radially outwardly therefrom. The master cylinder 409 is secured to the master cylinder support bracket 411 by means of a bolt 453 and a nut 455.

A proximal end of the stop switch cover 457 is held between the master cylinder 409 and the nut 455. The stop switch cover 457 has a bending end side covering the outer circumference of the stop switch 423 to shield heat to the stop switch 423 from the exhaust pipe located vehicle-width inwardly. A lateral wall of the stop switch cover 457 is bored with a hole portion 459 adapted to receive the extending portion 451. The stop switch cover 457 is provided on the vehicle-width inside of the stop switch 423 so as to be engaged with the extending portion 451 and fastened to the stop switch stay 447.

The stop switch cover 457 fastened to the stop switch stay 447 along with the master cylinder 409 is further engaged with the extending portion 451 of the stop switch stay 447 so as to be locked by the stop switch cover 457. This further ensures the heat shield and protection of the stop switch 423.

An arm portion 461 of the brake pedal 405 is provided with a spring hook 463. A return spring 465 is spanned between the spring hook 463 and a spring hook 411A provided on the master cylinder support bracket 411. As illustrated in FIG. 8, the arm portion 461 is depressed to turn the brake pedal 405 around the brake pedal shaft 413 counterclockwise. Thereafter, when the depression is released, the brake pedal 405 is turned clockwise by the restoring force of the return spring 465 and returned again to the position of FIG. 4.

When the brake pedal shaft 413 is depressed to turn the arm portion 429, the stop switch 423 is operatively pulled via the stop switch spring 433. A connecting portion 467, of the brake pedal 405, on the side opposite the arm portion 461 with the brake pedal shaft 413 put therebetween presses an input portion 469 of the master cylinder 409.

A retaining pin 471 of the connecting shaft 473 is inserted into the connecting portion 467 and the input portion 469. The brake pedal assembly 417 includes a stroke adjusting portion 475. The master cylinder support bracket 411 has a positioning hole 477 formed therein. The positioning hole 477 of the master cylinder support bracket 411 is engaged with a projecting portion 479 of the step holder 407. A co-fastening bolt 481 is passed through the step holder 407 and the master cylinder support bracket 411 shown in FIG. 7 and screwed to the body frame 11. The master cylinder 409 includes a reservoir tank connection pipe 483. The brake pedal assembly 417 includes a brake line connecting portion 484.

According to the step holder assembly 401 configured as above, as illustrated in FIG. 7, the master cylinder 409 is co-fastened to the step holder 407 via the master cylinder support bracket 411 and secured to the body frame 11. This enhances assembly performance. The composite structure in which the step holder 407 and the master cylinder support bracket 411 which are separate from each other are integrally co-fastened to each other can provide a vibration suppression effect.

Even if the master cylinder 409 vibrates in arrow "a" directions (FIG. 7) or other directions, vibration can be made difficult to be transmitted to the step holder 407 compared with the configuration where the master cylinder 409 is (directly) fastened to the step holder 407.

Next, a description is given of a procedure for assembling the step holder assembly 401.

Figure 9:
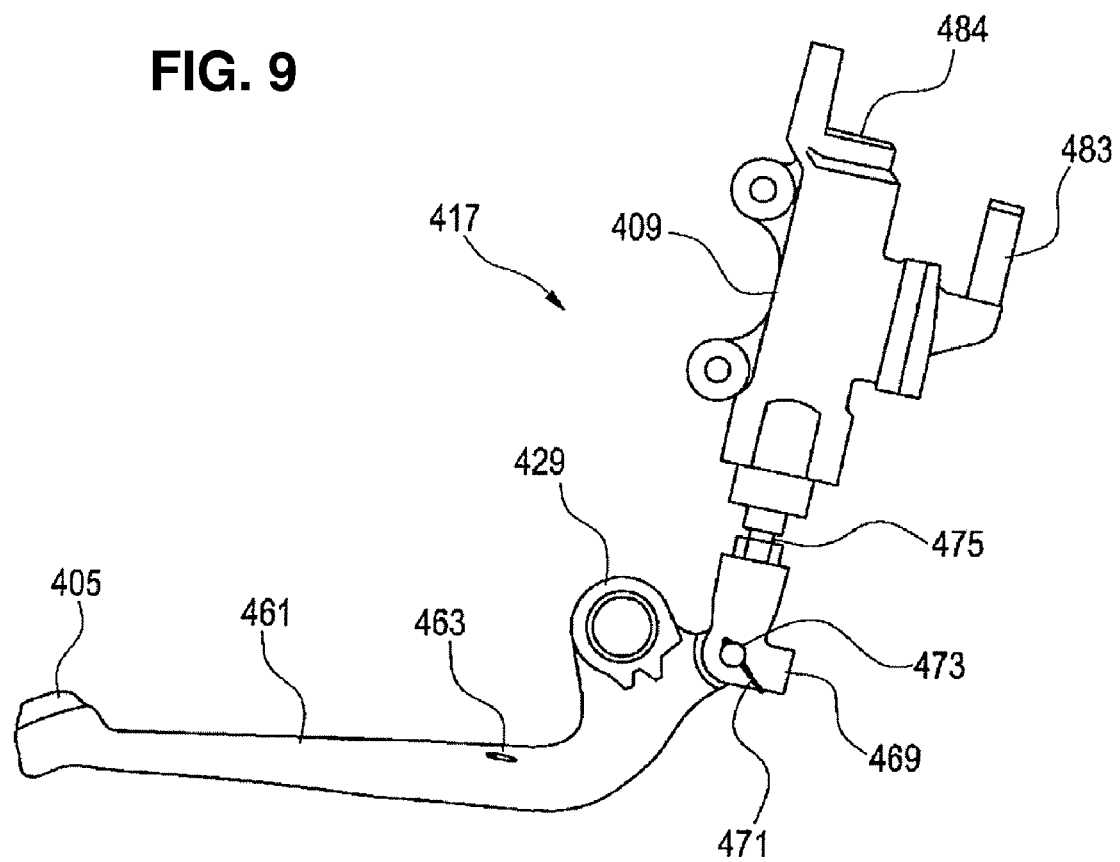
FIG. 9 is an explanatory view of an assembly procedure for assembling the brake pedal and a master cylinder.
Figure 10:
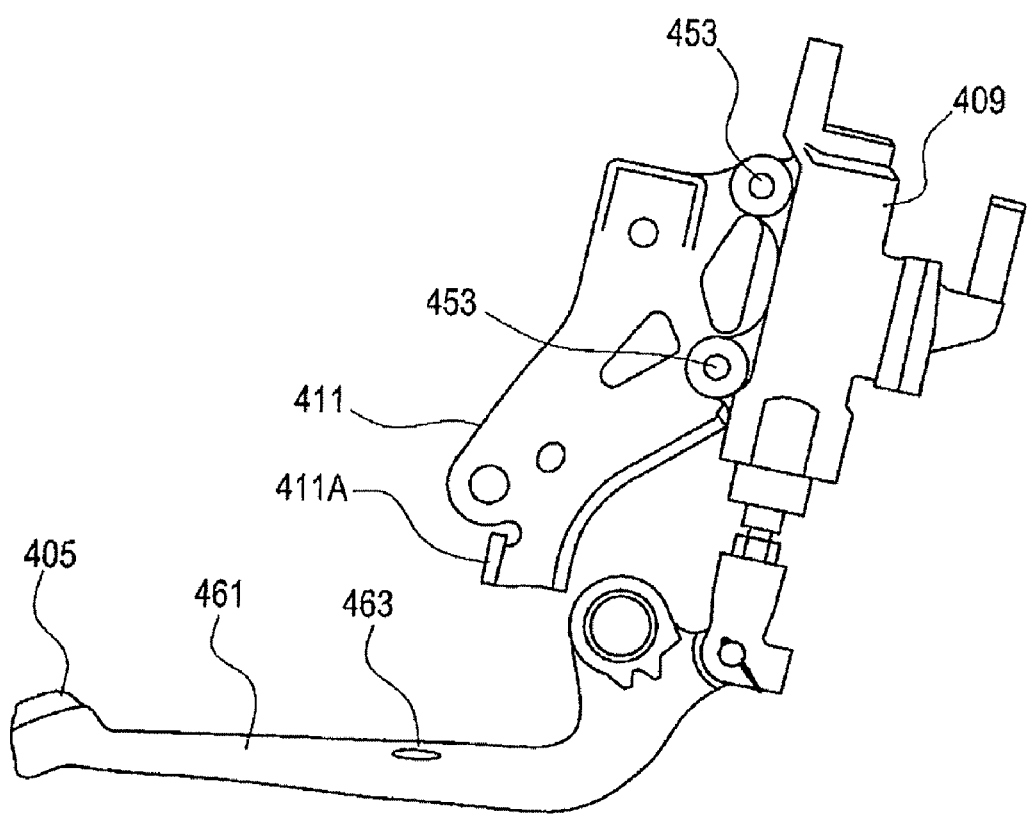
FIG. 10 is an explanatory view of an assembly procedure for assembling a master cylinder stay.
Figure 11:
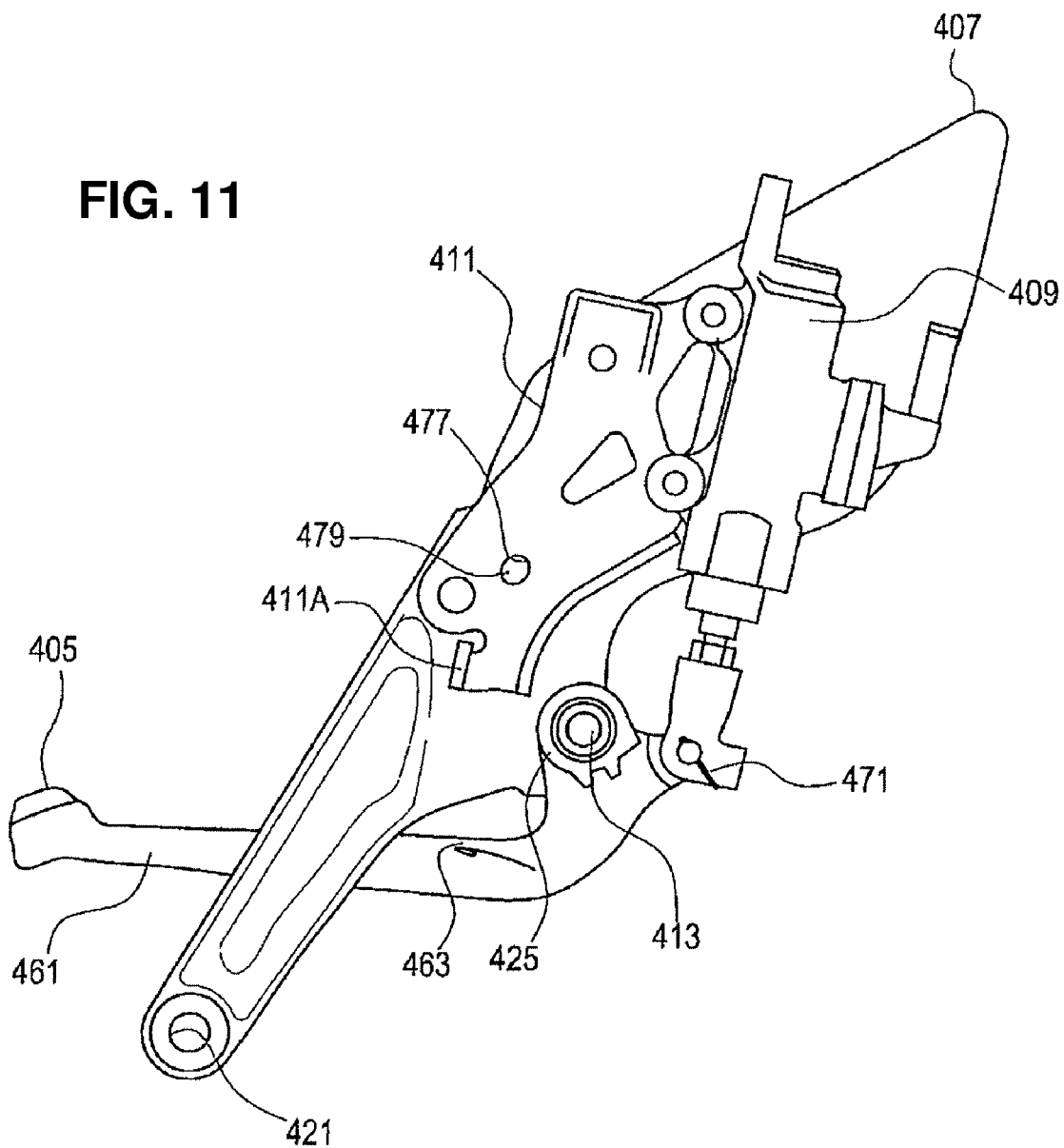
FIG. 11 is an explanatory view of an assembly procedure for assembling a step holder.
Figure 12:
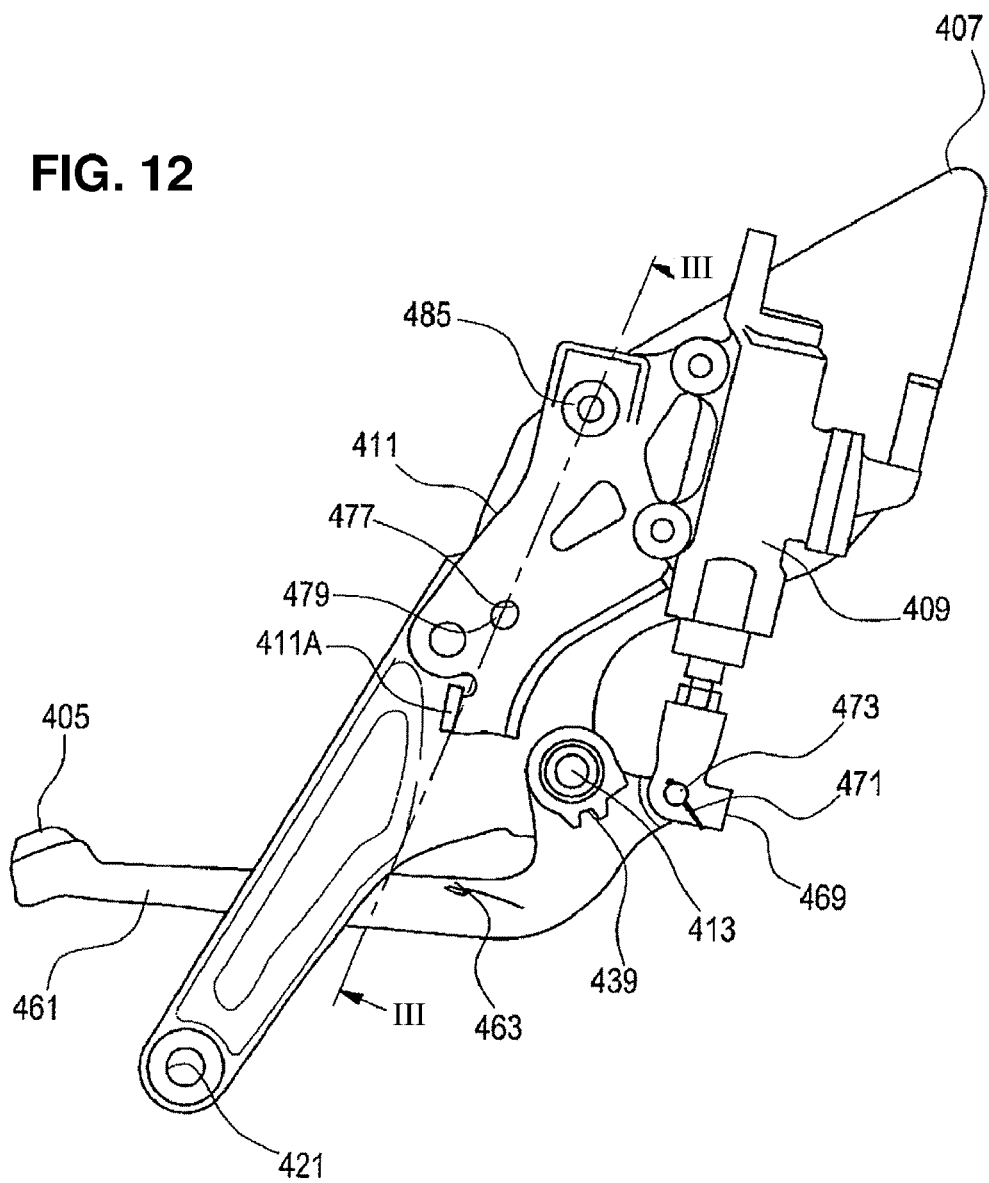
FIG. 12 is an explanatory view of an assembly procedure for securing a master cylinder stay.
Figure 13:
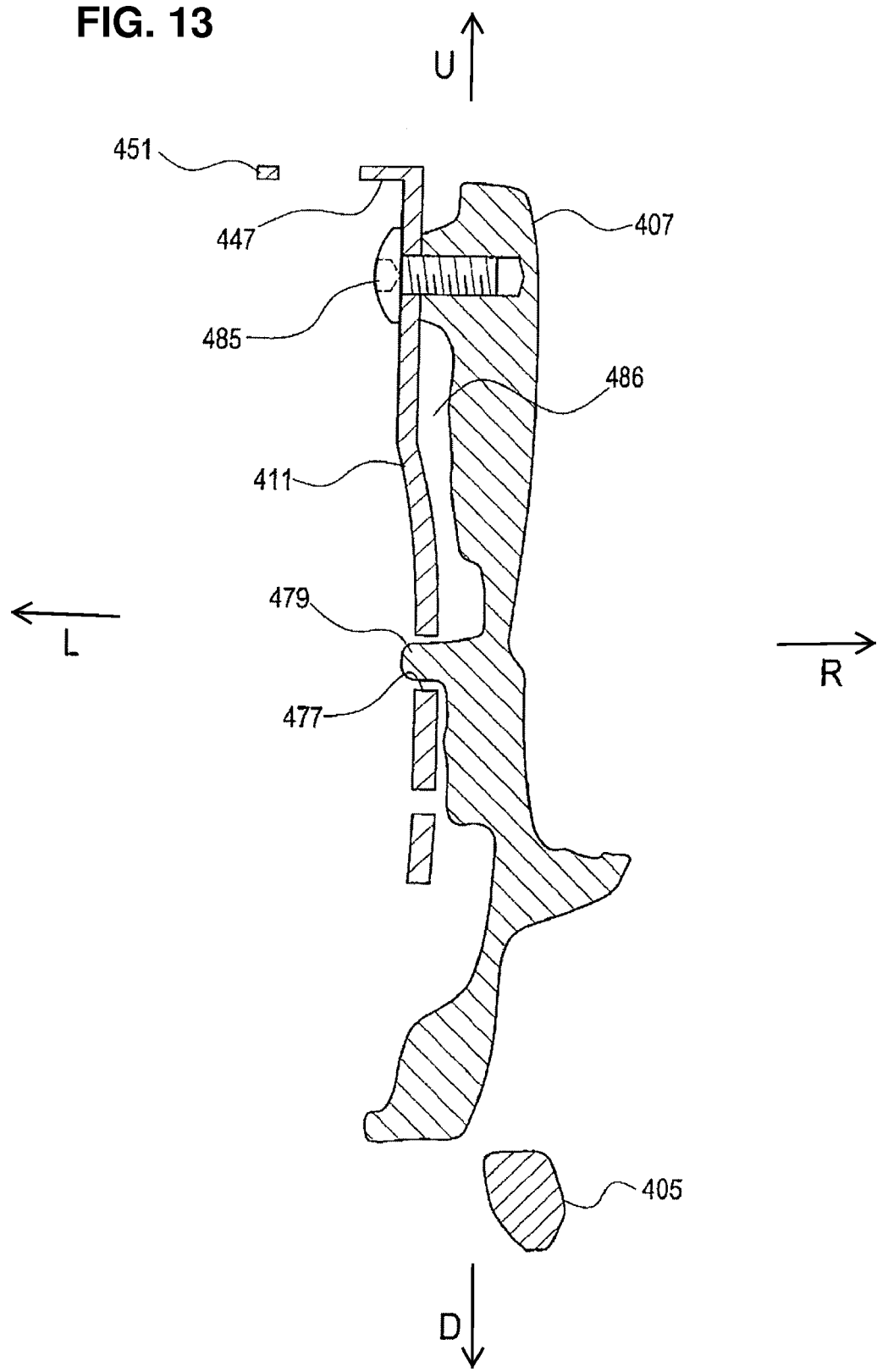
FIG. 13 is a cross-sectional view taken along line III-III of FIG. 12.

FIG. 9 is an explanatory view of an assembly procedure for assembling the brake pedal and the master cylinder. FIG. 10 is an explanatory view for a procedure for assembling the support bracket (master cylinder stay) 411. FIG. 11 is an explanatory view of an assembly procedure for assembling the step holder. FIG. 12 is an explanatory view of an assembly procedure for securing the master cylinder support bracket 411. FIG. 13 is a cross-sectional view taken along line III-III of FIG. 12.

As illustrated in FIG. 9, first, the master cylinder 409 and the brake pedal 405 are temporarily assembled to each other by inserting the connecting shaft 473 into the connecting portion 467 and retaining such connection by the retaining pin 471. As illustrated in FIG. 10, the master cylinder support bracket 411 is brought into a bolt insertion state with respect to the temporary assembly of the master cylinder 409 and the brake pedal 405. In this state, the nuts 455 are not yet fastened to the bolts 453, 453.

As illustrated in FIG. 11, the temporary assembly of the master cylinder 409, the brake pedal 405 and the master cylinder support bracket 411, illustrated in FIG. 10, is mounted to the step holder 407. The mounting is carried out by engaging the positioning hole 477 of the master cylinder support bracket 411 with the projecting portion 479 of the step holder 407 and inserting the bearing portion 425 of the brake pedal 405 to the brake pedal shaft 413.

In the state as illustrated in FIG. 12, a hexagon socket head screw 485 is fastened to secure the step holder 407 and the master cylinder support bracket 411 to each other.

As illustrated in FIG. 13, in the state where the hexagon socket head screw 485 is fastened up, a gap 486 is defined between the master cylinder support bracket 411 and the step holder 407, thereby making it difficult for vibration to be transmitted.

Figure 15:
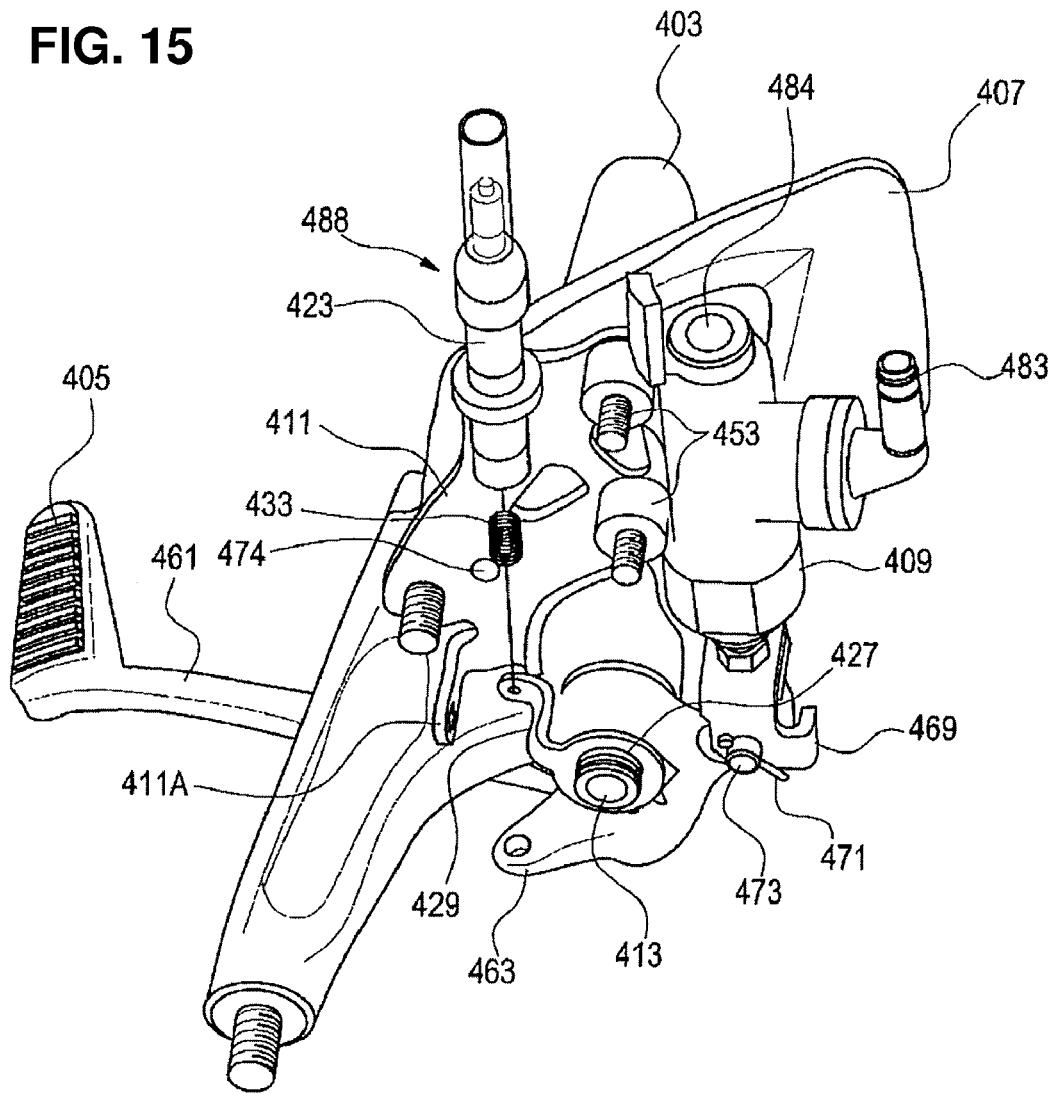
FIG. 15 is an explanatory view of an assembly procedure for assembling a stop switch.
Figure 16:
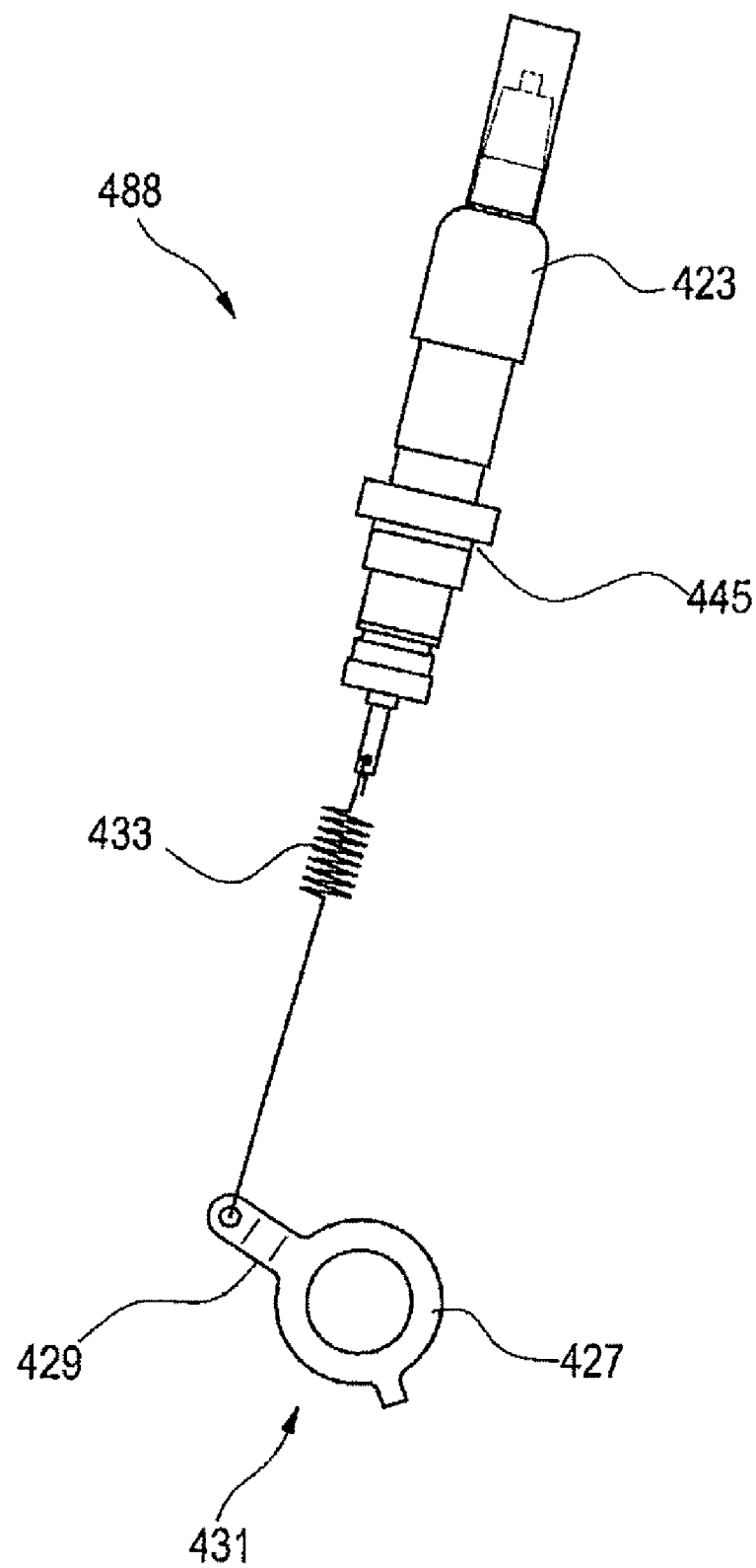
FIG. 16 is a lateral view of a stop switch assembly.
Figure 17:
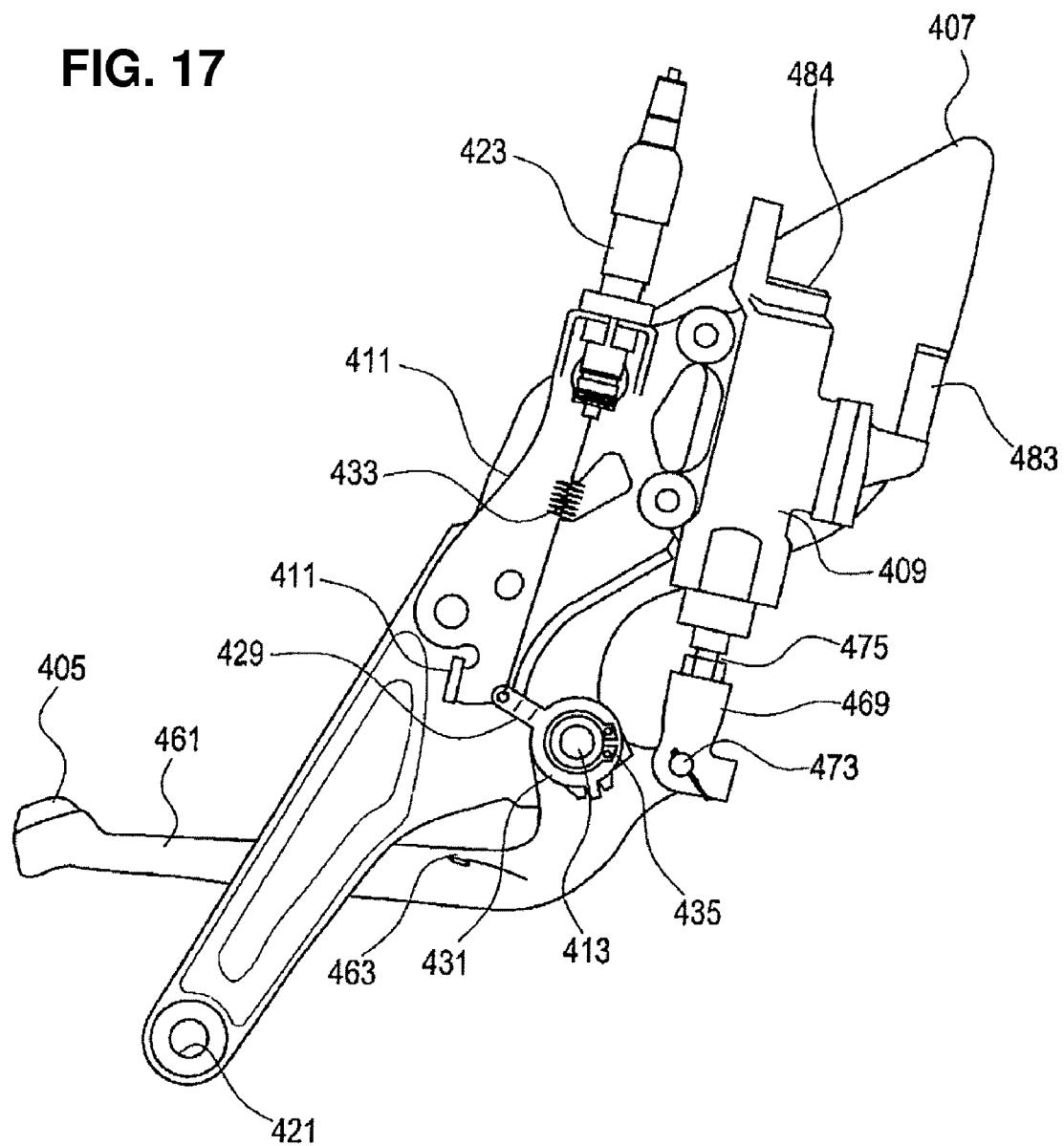
FIG. 17 is an explanatory view of an assembly procedure for securing a pedal shaft washer.
Figure 18:
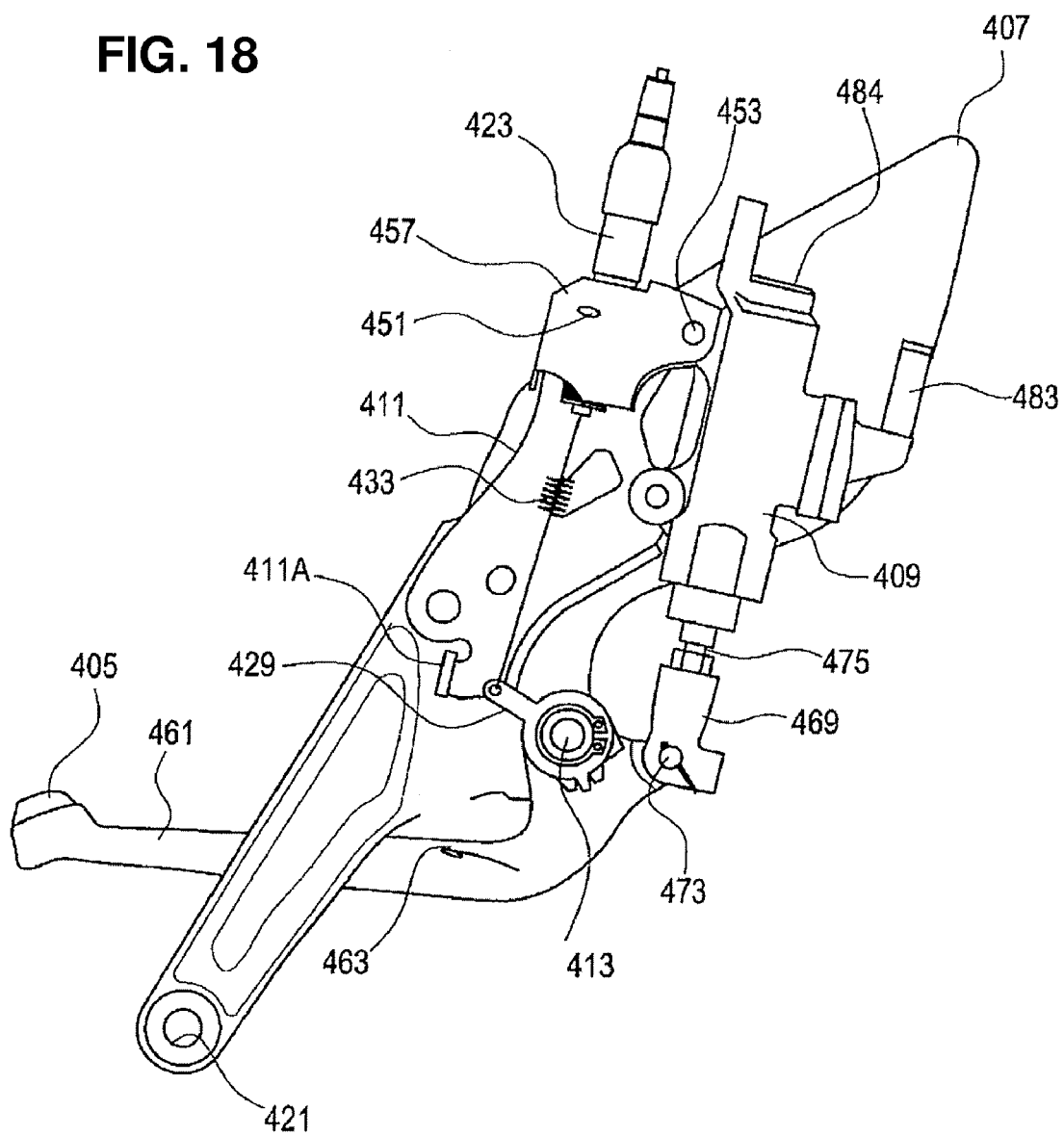
FIG. 18 is an explanatory view of an assembly procedure for assembling a stop switch cover.
Figure 19:
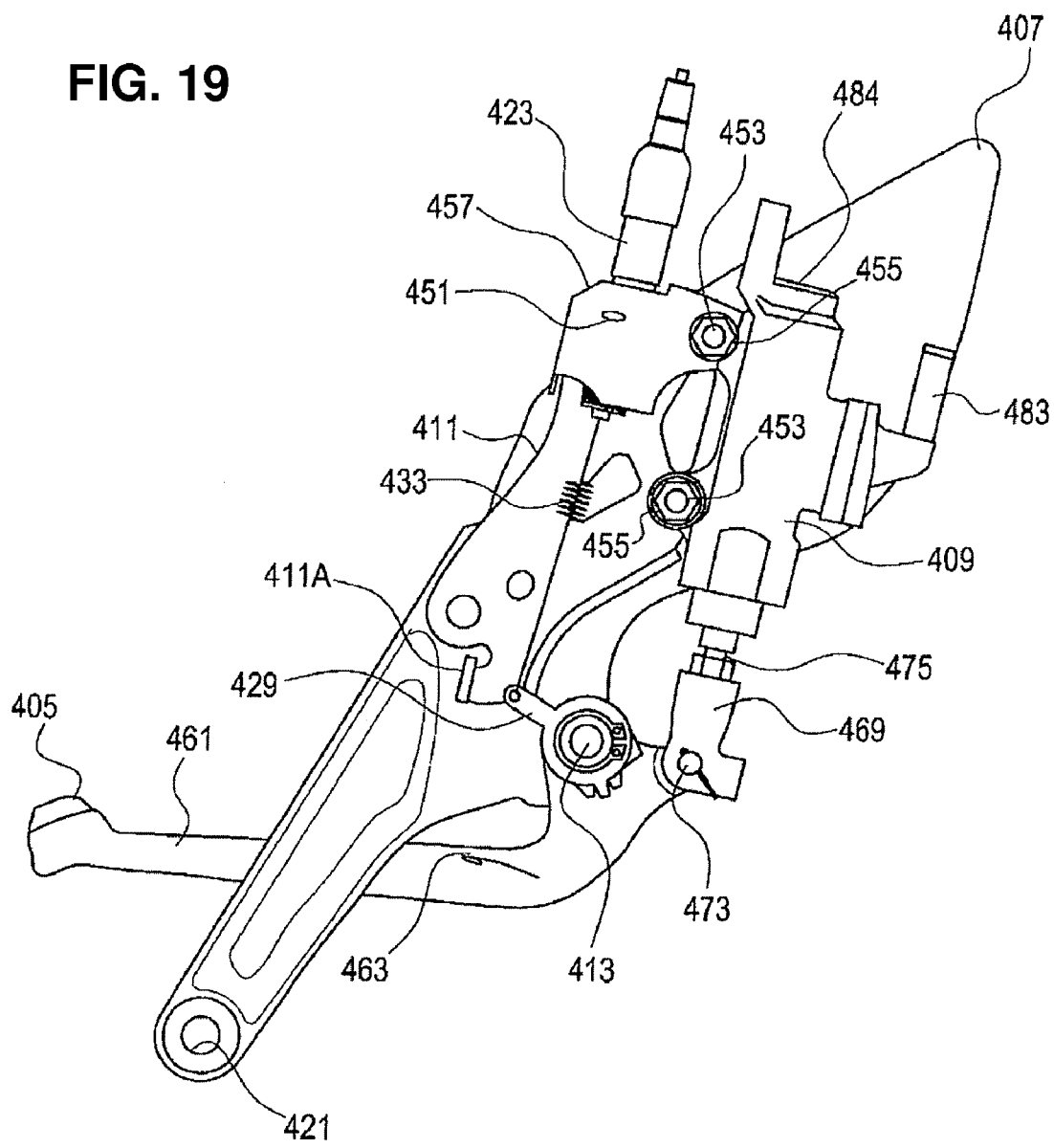
FIG. 19 is an explanatory view of an assembly procedure for co-fastening the master cylinder stay and the stop switch cover.
Figure 20:
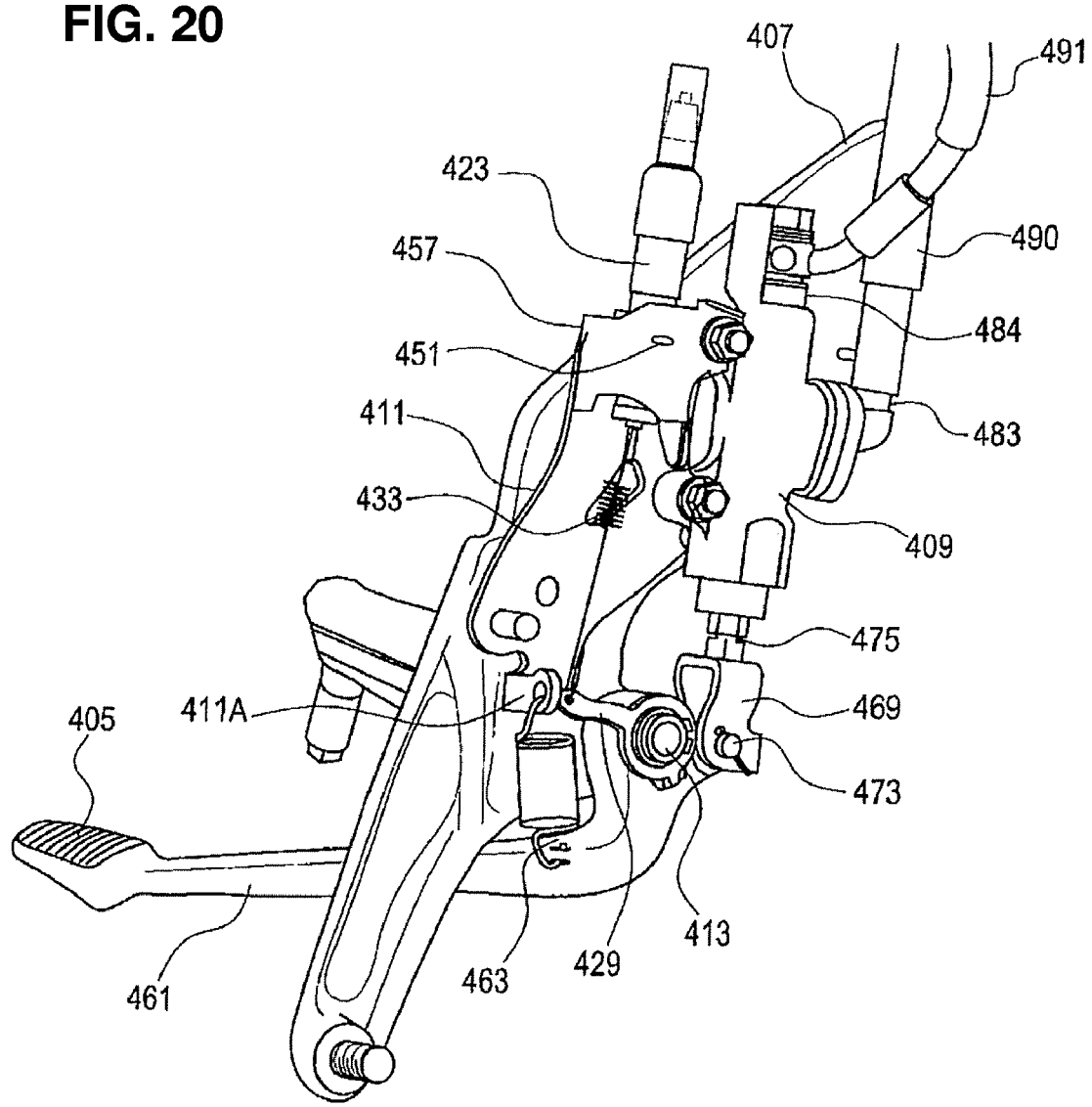
FIG. 20 is an explanatory view of an assembly procedure for connecting a brake hose.

FIG. 14 is a perspective view of FIG. 12 as viewed from obliquely above. FIG. 15 is an explanatory view of an assembly procedure for assembling the stop switch 423. FIG. 16 is a lateral view of the stop switch assembly. FIG. 17 is an explanatory view of an assembly procedure for securing a pedal shaft washer. FIG. 18 is an explanatory view of an assembly procedure for assembling a stop switch cover. FIG. 19 is an explanatory view of an assembly procedure for co-fastening the master cylinder stay and the stop switch cover. FIG. 20 is an explanatory view of an assembly procedure for connection with a brake hose.

As illustrated in FIG. 14, since the stop switch stay 447 is formed like a C-shape, it has a groove 487 capable of being increased in width inwardly in a vehicle-width direction. Thus, the stop watch stay 447 is elastically deformed to make the stop switch 423 attachable thereto.

As illustrated in FIG. 15, the stop switch temporal-assembly 488 is mounted to the master cylinder support bracket 411. As illustrated in FIG. 16, the stop switch temporary assembly 488 is one obtained by temporarily assembling the stop switch 423, the stop switch spring 433 and the washer member 431. In the stop switch 423, a small-diameter portion of the stop switch spring 433 is passed through the groove 487 formed in the engaging ring portion 449 of the stop switch stay 447 and moved downward to engage the circumferential groove 445 with the engaging ring portion 449.

As illustrated in FIG. 17, the washer member 431 fitted to the brake pedal shaft 413 is retained by the retaining ring 435. As illustrated in FIG. 18, the stop switch cover 457 is passed through the bolt 453 and the hole portion 459 (see FIG. 6) is aligned with the extending portion 451. In this state, as illustrated in FIG. 19, the bolts 453 are inserted into the master cylinder support bracket 411, the master cylinder 409 and the stop switch cover 457 and fastened with the nuts 455 for co-fastening.

As illustrated in FIG. 20, the return spring 465 is hooked on a lower support piece 489 of the master cylinder support bracket 411 and on the spring hook 463 of the brake pedal 405. Lastly, a pipe 490 from a reservoir tank is coupled to the reservoir tank connection pipe 483 and a brake line pipe 491 is coupled to the brake line connecting portion 484, thus completing the assembly.

A description is next given of a modification of the step holder assembly 401.

Figure 21:
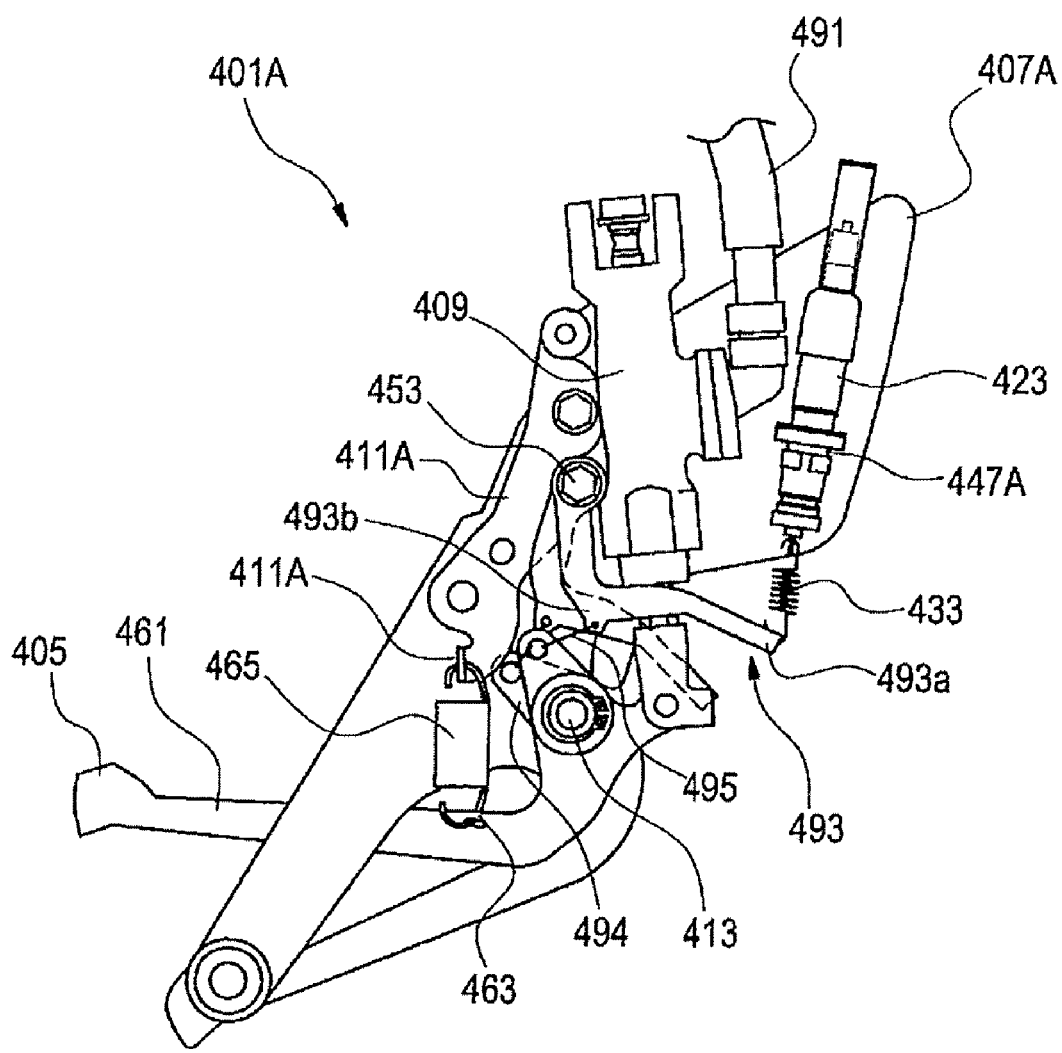
FIG. 21 is a lateral view of a modification having a different stop switch operation structure.

FIG. 21 is a lateral view of the modification having a different stop switch operation structure. Incidentally, like reference numerals are attached to the same configurations as those used for the step holder assembly 401 and redundant explanations are omitted.

A step holder assembly 401A according to the modification is such that the stop switch 423 is attached to a step holder 407A. The stop holder 407A is provided with a stop switch stay 447A.

The proximal end of a link member 493 is swingably supported by the bolt 453. The link member 493 includes a stop switch connecting portion 493a and a link connecting portion 493b. The brake pedal 405 is provided with a link connecting arm 494. The link connecting portion 493b of the link member 493 is connected to the link connecting arm 494 of the brake pedal 405 by means of a connecting member 495.

With the step holder assembly 401A according to the modification, if the brake pedal 405 is depressed, the connecting member 495 pulls the link connecting portion 493b of the link member 493 to turn the link member 493 clockwise, which pulls the stop switch 423 for operation. Since the stop switch 423 is directly secured to the stop holder 407, the master cylinder support bracket 411A can be downsized.

As described above, according to the motorcycle of the present embodiment, the rear master cylinder 409 can temporarily be assembled to the support bracket 411 separate from the step holder 407 and they can be co-fastened to the body frame 11. Therefore, assembly performance is satisfactory. In addition, even if the support bracket 411 resonates, the step holder 407 will not resonate, so that the vibration of the step can be reduced or prevented.

According to the motorcycle of the present embodiment, the pulling mechanism of the stop switch 423 can be provided in a compact manner.

According to the motorcycle of the present embodiment, the washer 431 can be turned together with the pedal bearing 425 so that the pulling mechanism of the stop switch 423 can be provided in a compact manner. The length of the pedal shaft can be suppressed according to the shaft length of the nut compared with the structure of securing the washer 431 through nut-fastening. Since it is not necessary to provide a large seat surface for the nut at the pedal bearing portion, the rear brake application system can be made more compact.

According to the motorcycle of the present embodiment, since the stop switch 423 is located anteriorly and the master cylinder 409 posteriorly, the brake application system can be made compact. In addition, the support bracket 411 can be attached in the state where the stop switch 423, the washer 431 and the stop switch spring 433 are temporarily assembled.

According to the motorcycle of the present embodiment, the stop switch 423 can be protected by the small number of components.

According to the motorcycle of the present embodiment, in addition to the effect of claim 1, the flexibility of arrangement of the master cylinder 409 and the stop switch 423 can be increased by the provision of the link member 493.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A saddle-type vehicle comprising:
a vehicle body frame;
a passenger step member;
a brake pedal;
a step holder having the passenger step member and the brake pedal mounted thereon, the step holder having a projecting portion formed thereon;
a support bracket formed separately from the step holder, the support bracket having a positioning hole formed therein which receives the projecting portion of the step holder therein; and
a master cylinder mounted on the support bracket, said master cylinder being adapted to convert a tread force received from the brake pedal into brake pressure;
wherein the step holder and the support bracket are configured such that during an assembling operation, the support bracket and the step holder are temporarily assembled with each other and aligned by placing the projecting portion of the step holder into the positioning hole of the support bracket; and then the step holder and the support bracket are co-fastened to the vehicle body frame.

2. A saddle-type vehicle comprising:
a vehicle body frame;
a passenger step member;
a brake pedal;
a step holder having the passenger step member and the brake pedal mounted thereon;
a support bracket formed separately from the step holder, wherein the step holder and the support bracket are configured such that during an assembling operation, the support bracket and the step holder are temporarily assembled with each other; and then the step holder and the support bracket are co-fastened to the vehicle body frame;
a master cylinder mounted on the support bracket, said master cylinder being adapted to convert a tread force received from the brake pedal into brake pressure;
a stop switch operatively attached to the support bracket;
a brake pedal shaft arranged inwardly of the step holder in a vehicle-width direction;
a bearing portion provided at a rear portion of the brake pedal, said bearing portion being adapted to slidably receive the brake pedal shaft therethrough;
a washer member provided inwardly of the bearing portion of the brake pedal in the vehicle-width direction, the washer member comprising:
an annular portion inserted into the brake pedal shaft, and
an arm portion extending radially outwardly from the annular portion; and
a stop switch spring connected to the stop switch, one end of the stop switch spring being connected to the arm portion of the washer member;
wherein during operation, the washer member is rotated together with the brake pedal through one of a retaining ring and nut-fastening member.

3. A saddle-type vehicle according to claim 2, wherein:
the brake pedal shaft is provided with a circumferential groove formed at an end portion thereof;
the bearing portion of the brake pedal has a recessed portion formed therein at an inner lateral surface thereof in the vehicle-width direction;
the washer member further comprises a tongue portion extending radially outwardly from the annular portion and bending outwardly in a vehicle-width direction;
the retaining ring is arranged inwardly of the washer member in the vehicle-width direction so as to be engaged with the circumferential groove of the brake pedal shaft; and
the tongue portion of the washer member is engaged with the recessed portion of the bearing portion of the brake pedal.

4. A saddle-type vehicle according to claim 2, wherein the stop switch has a groove formed in a lateral surface thereof, and further comprising a substantially C-shaped stop switch stay arranged at an upper portion of the support bracket forward of the master cylinder so as to be engaged with said groove of the stop switch; and wherein the master cylinder is mounted at an upper rear portion of the support bracket.

5. A saddle-type vehicle according to claim 3, wherein the stop switch has a groove formed in a lateral surface thereof, and further comprising a substantially C-shaped stop switch stay arranged at an upper portion of the support bracket forward of the master cylinder so as to be engaged with said groove of the stop switch; and wherein the master cylinder is mounted at an upper rear portion of the support bracket.

6. A saddle-type vehicle according to claim 4, further comprising a stop switch cover; wherein:
the substantially C-shaped stop switch stay comprises a C-shaped ring;
the substantially C-shaped stop switch stay is partially formed with an extending portion extending radially outwardly from the C-shaped ring; and
the stop switch cover engaged with the extending portion and fastened to the support bracket is arranged inwardly of the stop switch in the vehicle-width direction.

7. A saddle-type vehicle comprising:
a vehicle body frame;
a passenger step member;
a brake pedal;
a step holder having the passenger step member and the brake pedal mounted thereon;
a support bracket formed separately from the step holder; and
a master cylinder mounted on the support bracket, said master cylinder being adapted to convert a tread force received from the brake pedal into brake pressure;
wherein the step holder and the support bracket are configured such that during an assembling operation, the support bracket and the step holder are temporarily assembled with each other; and then the step holder and the support bracket are co-fastened to the vehicle body frame;
a stop switch mounted on the step holder,
a link member pivotally supported by the support bracket, said link member having a stop switch connecting portion and a link connecting portion,
a link connecting arm provided with the brake pedal; and
a connecting member connected to the link connecting portion of the link member and to the link connecting arm of the brake pedal.

8. A saddle-type vehicle according to claim 1, wherein the step holder and the support bracket are co-fastened to the vehicle body frame such that a gap is formed between the support bracket and the step holder, thereby minimizing transmission of vibration from the support bracket to the step holder during operation of the vehicle.

9. A motorcycle comprising:
a vehicle body frame;
a passenger step member;
a brake pedal;
a step holder having the passenger step member and the brake pedal mounted thereon;
a support bracket formed separately from the step holder, wherein the step holder and the support bracket are arranged and co-fastened to the vehicle body frame such that a gap is formed between the support bracket and the step holder;
a master cylinder mounted on the support bracket, said master cylinder being adapted to convert a tread received force from the brake pedal into brake pressure;
a stop switch attached to the support bracket;
a brake pedal shaft arranged inwardly of the step holder in a vehicle-width direction;
a bearing portion arranged at a rear portion of the brake pedal, said bearing portion being adapted to insertably receive the brake pedal shaft passing therethrough;
a washer member arranged inwardly of the bearing portion of the brake pedal in the vehicle-width direction, the washer member including
an annular portion inserted into the brake pedal shaft, and
an arm portion extending radially outwardly from the annular portion; and
a stop switch spring connected to the stop switch, one end of the stop switch spring being connected to the arm portion of the washer member;
wherein during operation, the washer member is rotated together with the brake pedal through a retaining ring.

10. A motorcycle according to claim 9, wherein:
the brake pedal shaft includes a circumferential groove formed at an end portion thereof,
the bearing portion of the brake pedal has a recessed portion formed therein at an inner lateral surface thereof in the vehicle-width direction;
the washer member further comprises a tongue portion extending radially outwardly from the annular portion and bending outwardly in a vehicle-width direction;
the retaining ring is arranged inwardly of the washer member in the vehicle-width direction so as to be engaged with the circumferential groove of the brake pedal shaft; and
the tongue portion of the washer member is engaged with the recessed portion of the bearing portion of the brake pedal.

11. A motorcycle according to claim 9, further comprising:
the stop switch having a groove formed in a lateral surface thereof;
a C-shaped stop switch stay arranged at an upper portion of the support bracket forward of the master cylinder so as to be engaged with said groove of the stop switch;
wherein the master cylinder is mounted at the upper rear portion of the support bracket.

12. A motorcycle according to claim 11, further comprising a stop switch cover; wherein:
the C-shaped stop switch stay comprises a C-shaped ring;
the C-shaped stop switch stay is partially formed with an extending portion extending radially outwardly of the C-shaped ring; and
the stop switch cover engaged with the extending portion and fastened to the support bracket is arranged inwardly of the stop switch in the vehicle-width direction.

13. A motorcycle comprising:
a vehicle body frame;
a passenger step member;
a brake pedal;
a step holder having the passenger step member and the brake pedal mounted thereon;
a support bracket formed separately from the step holder, wherein the step holder and the support bracket are arranged and co-fastened to the vehicle body frame such that a gap is formed between the support bracket and the step holder;
a master cylinder mounted on the support bracket, said master cylinder being adapted to convert a tread received force from the brake pedal into brake pressure;
a stop switch mounted on the step holder,
a link member pivotally supported by the support bracket, said link member having a stop switch connecting portion and a link connecting portion,
a link connecting arm provided with the brake pedal; and
a connecting member connected to the link connecting portion of the link member and to the link connecting arm of the brake pedal.

14. A step holder attachment structure for a vehicle, said vehicle comprising:
a vehicle body frame;
a passenger step member;
a brake pedal; and
a master cylinder adapted to convert a tread force from the brake pedal into brake pressure;
wherein said step holder attachment structure comprises:
a step holder having the passenger step member and the brake pedal mounted thereon and
a support bracket for receiving the master cylinder thereon, said support bracket being formed separately from the step holder, wherein the step holder and the support bracket are co-fastened to the vehicle body frame such that a gap is formed between the support bracket and the step holder, thereby minimizing transmission of vibration from the support bracket to the step holder during operation of the vehicle;
a stop switch attached to the support bracket;
a brake pedal shaft arranged inwardly of the step holder in a vehicle-width direction;
a bearing portion provided at a rear portion of the brake pedal, said bearing portion being adapted to insertably receive the brake pedal shaft passing therethrough;
a washer member provided inwardly of the bearing portion of the brake pedal in the vehicle-width direction, the washer member comprising:
an annular portion inserted into the brake pedal shaft, and
an arm portion extending radially outwardly from the annular portion; and
a stop switch spring connected to the stop switch, one end of the stop switch spring being connected to the arm portion of the washer member;
wherein during operation, the washer member is rotated together with the brake pedal.

15. A step holder attachment structure according to claim 14, wherein:
the brake pedal shaft has a circumferential groove formed at an end portion thereof,
the bearing portion of the brake pedal has a recessed portion formed therein at an inner lateral surface thereof in the vehicle-width direction;

the washer member further comprises a tongue portion extending radially outwardly from the annular portion and bending outwardly in the vehicle-width direction;

the retaining ring is arranged inwardly of the washer member in the vehicle-width direction so as to be engaged with the circumferential groove of the brake pedal shaft; and the tongue portion of the washer member is engaged with the recessed portion of the bearing portion of the brake pedal.

16. A step holder attachment structure according to claim 14, wherein the stop switch has a groove formed in a lateral surface thereof; and further comprising a substantially C-shaped stop switch stay arranged at an upper portion of the support bracket forward of the master cylinder so as to be engaged with said groove of the stop switch; and wherein the master cylinder is mounted at the upper rear portion of the support bracket.

17. A step holder attachment structure according to claim 16, wherein said vehicle further comprises a stop switch cover; and wherein:

the substantially C-shaped stop switch stay comprises a C-shaped ring;

the substantially C-shaped stop switch stay is formed with an extending portion extending radially outwardly of the C-shaped ring; and the stop switch cover engaged with the extending portion and fastened to the support bracket is arranged inwardly of the stop switch in the vehicle-width direction.

18. A step holder attachment structure for a vehicle, said vehicle comprising:

a vehicle body frame;

a passenger step member;

a brake pedal; and a master cylinder adapted to convert a tread force from the brake pedal into brake pressure;

said step holder attachment structure comprising:

a step holder having the passenger step member and the brake pedal mounted thereon and a support bracket for receiving the master cylinder thereon, said support bracket being formed separately from the step holder, wherein the step holder and the support bracket are co-fastened to the vehicle body frame such that a gap is formed between the support bracket and the step holder, thereby minimizing transmission of vibration from the support bracket to the step holder during operation of the vehicle;

a stop switch mounted on the step holder, a link member pivotally supported by the support bracket, said link member having a stop switch connecting portion and a link connecting portion, a link connecting arm provided with the brake pedal; and a connecting member connected to the link connecting portion of the link member and to the link connecting arm of the brake pedal.

* * * * *